United States Patent
Nuzman et al.

(10) Patent No.: US 10,324,857 B2
(45) Date of Patent: Jun. 18, 2019

(54) LINEAR MEMORY ADDRESS TRANSFORMATION AND MANAGEMENT

(71) Applicant: Intel Corporation, Santa Clara, CA (US)

(72) Inventors: Joseph Nuzman, Haifa (IL); Raanan Sade, Kibutz Sarid (IL); Igor Yanover, Yokneam Illit (IL); Ron Gabor, Hertzliya (IL); Amit Gradstein, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 15/416,549

(22) Filed: Jan. 26, 2017

(65) Prior Publication Data

US 2018/0210842 A1   Jul. 26, 2018

(51) Int. Cl.
*G06F 12/10*     (2016.01)
*G06F 12/1036*   (2016.01)
*G06F 12/1027*   (2016.01)

(52) U.S. Cl.
CPC ...... *G06F 12/1036* (2013.01); *G06F 12/1027* (2013.01); *G06F 2212/1016* (2013.01); *G06F 2212/657* (2013.01); *G06F 2212/683* (2013.01); *G06F 2212/684* (2013.01)

(58) Field of Classification Search
USPC ....................................... 711/207
See application file for complete search history.

(56) References Cited

U.S. PATENT DOCUMENTS

| | | | | |
|---|---|---|---|---|
| 5,617,554 A * | 4/1997 | Alpert | ........... | G06F 12/1009 711/208 |
| 6,301,647 B1 * | 10/2001 | Green | ........... | G06F 12/1027 711/156 |
| 6,374,341 B1 * | 4/2002 | Nijhawan | ........... | G06F 12/1027 711/200 |
| 8,838,935 B2 * | 9/2014 | Hinton | ........... | G06F 12/0292 711/203 |
| 8,972,746 B2 * | 3/2015 | Johnson | ........... | G06F 21/6218 713/189 |
| 9,069,690 B2 * | 6/2015 | Hildesheim | ........... | G06F 12/1027 |
| 2008/0301398 A1 * | 12/2008 | Falik | ........... | G06F 12/1009 711/206 |
| 2012/0079232 A1 * | 3/2012 | Hinton | ........... | G06F 12/0292 711/207 |
| 2012/0159184 A1 * | 6/2012 | Johnson | ........... | G06F 21/6218 713/189 |
| 2015/0356024 A1 * | 12/2015 | Loh | ........... | G06F 12/1054 711/113 |

\* cited by examiner

*Primary Examiner* — Mano Padmanabhan
*Assistant Examiner* — Jean C Edouard
(74) *Attorney, Agent, or Firm* — Lowenstein Sandler LLP

(57) ABSTRACT

A processing device including a linear address transformation circuit to determine that a metadata value stored in a portion of a linear address falls within a pre-defined metadata range. The metadata value corresponds to a plurality of metadata bits. The linear address transformation circuit to replace each of the plurality of the metadata bits with a constant value.

22 Claims, 22 Drawing Sheets

LINEAR MEMORY ADDRESS TRANSFORMATION AND MANAGEMENT

TECHNICAL FIELD

The implementations of the disclosure relate generally to processing devices and, more specifically, to linear memory address transformation and management.

BACKGROUND

Linear memory is a memory addressing paradigm in which memory appears to a program (executed by a processing device) as a single contiguous address space. By implementing a linear memory paradigm, the processing device (central processing unit (CPU)) can directly (and linearly) address all of the available memory locations without having to resort to any sort of memory segmentation or paging schemes.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1A:
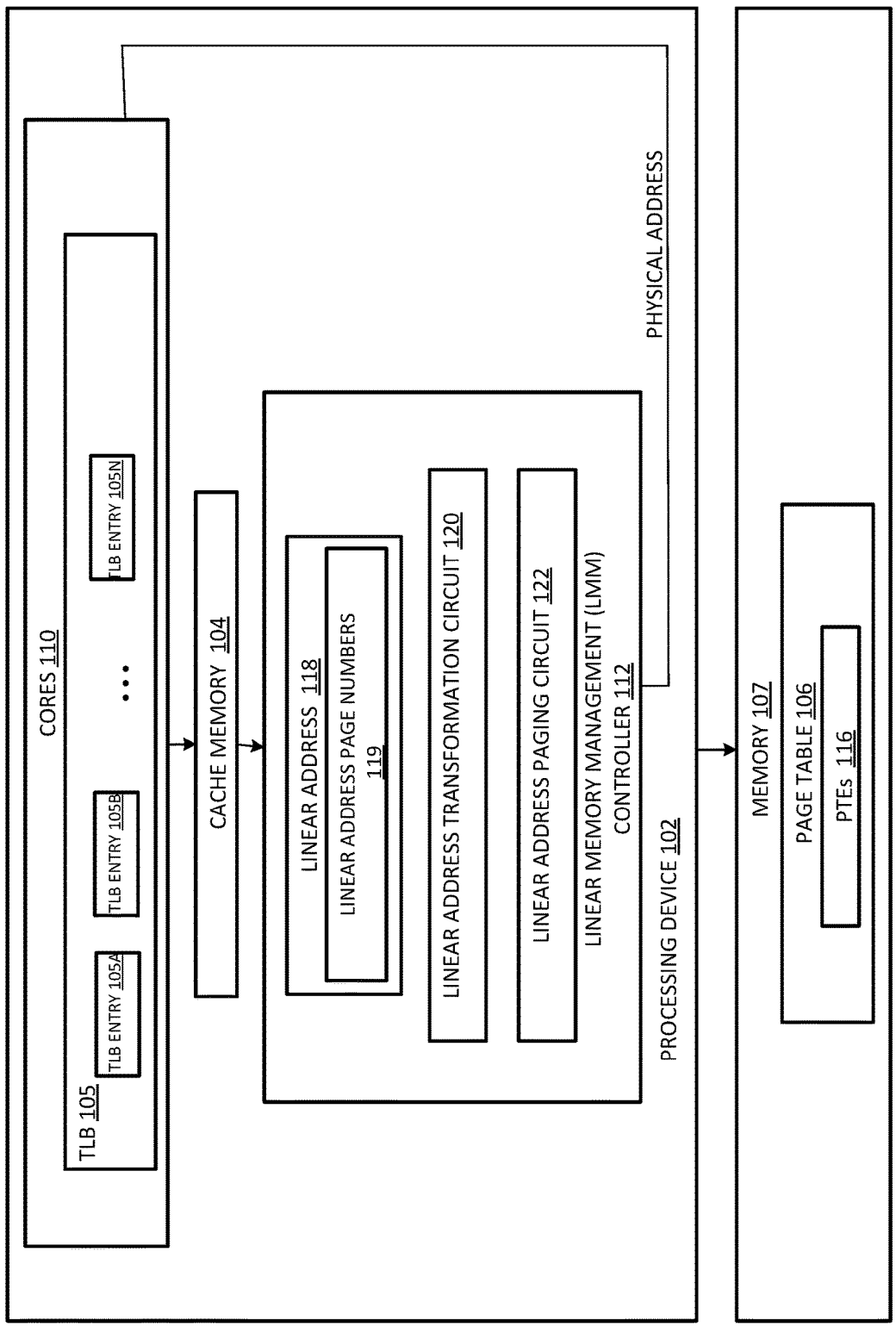
FIG. 1A illustrates a processing system according an implementation of the disclosure.

A computing device may include one or more processing cores in one or more processors (such as central processing units (CPUs)) for executing instructions. The computing device may also include a memory device (such as random-access memory (RAM)) for storing instructions and data associated with executing tasks (including user applications and system applications such as the kernel of an operating system) on the one or more processing cores. Instructions of each application program address the memory using linear addresses of a virtual memory. The linear addresses may be translated into physical addresses of the memory by a memory management unit (MMU) associated with the one or more processors. One (or more) of the tasks executed on a processing core may be a memory request to page or access (read or write) memory referenced by the linear addresses, which may be translated into the physical addresses of the memory by the MMU.

Conventional linear memory management systems provide for paging those linear addresses that do not include metadata (i.e., linear addresses that do include metadata are not paged in convention systems). In other words, all bits within the linear address space are used for addressing memory, and no bits in that space are used for description of the data that will not be part of the actual memory addressing (we refer to these bits as Metadata bits). Metadata may refer to a set of data that describes and provides information about data (e.g., data of the memory page being paged). Conventional systems may provide for such paging by allowing the metadata bits to be placed in a portion (e.g., upper bits) of the linear address that is not paged. As a result, the conventional systems provide for less flexibility with respect to positioning of the metadata within the linear address.

Another conventional system for metadata placement in linear address bits may be a software solution where multiple pages are mapped to a same physical address. The hardware is not stripping off the metadata in this system. However, the performance penalty is significant due to an increased pressure on page caching (e.g., 4 bits of metadata increase pressure on page caching by up to 16×, 6 bits of metadata increase pressure on page caching by up to 64×, and so on).

Implementations of the disclosure overcome the above-noted and other deficiencies by implementing a linear memory management system that allows for flexible positioning of metadata in the linear address that is paged. In one implementation, when a linear address having metadata bits is used for a memory access, the linear address is transformed by removing the metadata bits from the linear address and replacing those metadata bits with a constant value (e.g., all zeros or the most-significant-bit of the original address). The linear address transformation may be performed off of the critical path of the load loop (e.g., between generation of linear address and translation lookaside buffer (TLB) lookup of linear address-to-physical address mapping). In one implementation, the linear address transformation is performed as part of a page miss handling routine. In another implementation, the linear address transformation is performed while generating the linear address itself. Accordingly, the implementations of the disclosure prevent additional cycle path(s) and, as a result, improve the performance of the processor during task execution.

FIG. 1A illustrates a processing system 100 including a processing device 102 coupled to a memory 107 according an implementation of the disclosure. The processing device 102 (such as a central processing unit (CPU)) may include a linear memory management (LMM) controller 112 connected to memory hardware, such as cache memory 194 having cache units. The LMM controller 112 is a computer hardware component that handles all of the linear memory and caching operations associated with the processing device 102. The cache units may include a hierarchy of cache levels stored on the processing device 102 and off of the processing device. A fastest Level 1 (L1) cache may be included as memory 104 on the processing device 102. The cache memory 104 may store data associated with system application and user application programs executed by the processing device 102. Additional lower-level caches (e.g., L2, L3, etc.) may be located both on and off of the processing device 102.

In one implementation, the processing device 102 may further include one or more processing cores 110. The one or more processing cores are the engines within the processing device 102 for executing tasks, such as the system applications and the user application programs. In one implementation, the tasks executed on processing cores 110 access virtual memory using linear addresses (also known as virtual addresses). The LMM controller 112 may map the virtual addresses of the virtual memory to the physical addresses of the memory (a.k.a. "off chip memory") 107. The space of virtual addresses may be divided into fixed sized units called pages. A page of the virtual addresses may be mapped correspondingly into fixed-sized units in the space of the physical addresses of the cache memory 104, called memory frames.

In one implementation, the LMM controller 112 includes one or more linear addresses (LA) 118 having linear address pages numbers 119, which correspond to a page table 106 having one or more page table entries (PTEs) 116 stored in the memory 107. The page table entries are also known as leaf nodes of the page table 106. In one implementation, LMM controller 112 may perform memory address mapping. Each of the PTEs 116 may store one or more memory frame numbers that are identified according to the linear address page numbers 119. In one implementation, a task executing on the processing cores 110 may allocate a block of memory by specifying one or more linear address ranges. The LA 118 may include a first portion including one or more bits (e.g., the high-order or upper twenty bits) indicating the linear address page number 119 and a second portion of bits (e.g., the lower-order or lower 12 bits) indicating the byte offset within a memory frame corresponding to the page. The PTE 116 stores mappings between pages of linear addresses to physical addresses. The mappings may be the mapping between identifiers of pages (or page numbers) to identifiers of memory frames (or memory frame numbers). The memory frame numbers determine the region of the cache memory 104 allocated to a task. In one implementation, these mappings are part of a page table.

The LMM controller 112 may use the linear address page number 119 from the LA 118 to identify a memory frame number stored in the PTE 116, and combine the identified memory frame number and the offset byte to form a physical address, corresponding to the PTEs 116 stored in the page table 106 in the memory 107. The physical address corresponding to the virtual address may be stored in a buffer.

In one implementation, the virtual to physical address translation received from the PTE 116 is used to populate a translation look-aside buffers (TLB) 105 in at least one of the cores 110 (in some implementations there is a TLB 105 in each core 110). In one implementation, the TLB 105 functions to page or look up data in the cache memory 104 for faster retrieval.

In one implementation, the LMM controller 112 includes a linear address transformation (LAT) circuit 120 that transforms the LA 118. The LAT circuit 120 is a computer hardware component that handles transformation of the LA 118 by determining that a value (metadata value) stored in at least a portion of the LA 118 falls within a pre-defined metadata range and stripping metadata bits corresponding to the metadata value in the LA 118.

In one implementation, the LAT circuit 120 transforms the LA 118 when the LA 118 is used for a memory access task and includes a plurality of metadata bits. In one implementation, LAT circuit 120 determines that the metadata value stored in a portion of the LA 118 falls within a pre-defined metadata range. The metadata value corresponds to the plurality of metadata bits. In one implementation, a metadata range is a range of memory in which some bits are reserved for metadata and the rest of the memory does not have any bits reserved for metadata. Each of the plurality of metadata bits are the bits that are used for the metadata for any address that is within the metadata range. Each of the plurality of metadata bits is used for description of data stored in the LA 118 and is not part of the memory addressing. In one implementation, the metadata value stored in the LA 118 is within the metadata range if its upper bits (63 to X+N) are equal to a pre-defined value. In one implementation, the pre-defined metadata range may refer to a value in the upper portion of the linear address space, from the most significant bit (MSB) to the MSB of the bits reused for metadata (excluding that bit) (e.g., bits 63 to bit X+N, where X is the least significant bit (LSB) of the metadata bits position and N is the number of bits reserved for metadata). If the metadata value stored in any portion of the LA 118 is determined to be within the pre-defined metadata range, then each of the bits corresponding to the value can be used for metadata and are identified as metadata bits, otherwise these bits are regular address bits. In one implementation, the LAT circuit 120 removes each of the metadata bits in the address and replaces them with a constant value (e.g., all zeros, etc.) prior to paging by one of a plurality of TLB entries 105A-105N of the TLB 105. Some implementations may have multiple metadata ranges, and in each range a set of bits may be reserved for metadata.

In one implementation, the LMM controller 112 includes a linear address paging (LAP) circuit 122 that manages a TLB entry among the plurality of TLB entries 105A-105N. The managed TLB entry pages a portion of a translation of the LA 118, i.e. the physical address corresponding to the portion of the LA 118. The LAP circuit 122 is a computer hardware component that manages paging a portion of the physical address corresponding to the portion of the LA 118 having the metadata value that falls within the pre-defined metadata range.

In one implementation, the LAP circuit 122 initially provides an assurance that the TLB 105 does not include any TLB entries 105A-105N paging a portion of the LA 118 having the metadata value that falls within a pre-defined metadata range. The LAP circuit 122 may flush (e.g., clear the entries) the TLB entry among the plurality of the TLB entries 105A-15N in the TLB 105 when either a configuration of allowing metadata in LA 118 is turned on or when the configuration of metadata in LA 118 is changed (e.g., position of the metadata bits corresponding to the metadata in the LS 118 is changed). As a result, when metadata of the LA 118 is either initially configured and/or updated, any memory access tasks referring to the LA 118 that have the metadata corresponding to the metadata bits within the predefined metadata range result in a TLB 105 miss by a TLB entry among the plurality of the TLB entries 105A-15N. In one implementation, page miss handling hardware (not shown) of the processing device 102 may perform a page miss handling routine.

Upon any TLB 105 misses, the LAP circuit 122 further determines that a metadata value in any of the portion of the LA 118 falls within the pre-defined metadata range. The LAP circuit 122 sets a metadata status flag in a corresponding TLB entry among the plurality of TLB entries 105A-105N. In one implementation, the metadata status flag provides status of the metadata in the LA 118. Status of the metadata determines whether the metadata value stored in a portion of the LA 118 is in the pre-defined metadata range. The metadata status flag that is set indicates that corresponding TLB entry among the plurality of TLB entries 105A-105N of the TLB 105 belongs to portion of the LA 118 that is in the pre-defined metadata range. In one implementation, the metadata status flag includes a flag bit set to 1. Accordingly, every TLB entry among the plurality of TLB entries 105A-105N of the TLB 105 includes a LA 118, a corresponding physical address, and a metadata status flag.

In one implementation, the LAT circuit 120 transforms the LA 118 after a TLB 105 miss occurs in the hardware and it is determined that the metadata value stored in the LA 118 falls within the pre-defined metadata range. In one implementation, the LAT circuit 120 removes the plurality of metadata bits corresponding to the metadata value in the LA 118 and replaces them with a constant value. In one example, the constant value is 0. The replaced metadata bits in the LA 118 may be referred to herein as "stripped" metadata bits.

In one implementation, the LAP circuit 122 ignores each of the plurality of metadata bits corresponding to the metadata value in the LA 118 after the LA 118 is generated but before the LA 118 to physical address translation for paging by a TLB entry among the plurality of TLB entries 105A-105N of the TLB 105. As discussed above, a metadata status flag of the TLB entry among the plurality of TLB entries 105A-105N that is set indicates that the TLB 105 is paging a portion of the LA 118 that includes the metadata value. In one implementation, a metadata-bits-ignore control signal is generated and sent to the LAP circuit 122 when the metadata status flag in the TLB entry among the plurality of TLB entries 105A-105N of the TLB 105 is set. The metadata-bits-ignore control signal indicates to the LAP circuit 122 to ignore the metadata bits (i.e., corresponding to the metadata value in the pre-defined range) during a TLB 105 lookup process.

In further implementations, a metadata-bits-ignore control signal is generated for the LAP circuit 122 while (e.g., in parallel to) the LA 118 is being generated. In this way, the metadata range match for the LA 118 can be performed at an earlier time in the processing cycle than at the TLB 105 page miss handling routine as described above.

Figure 1B:
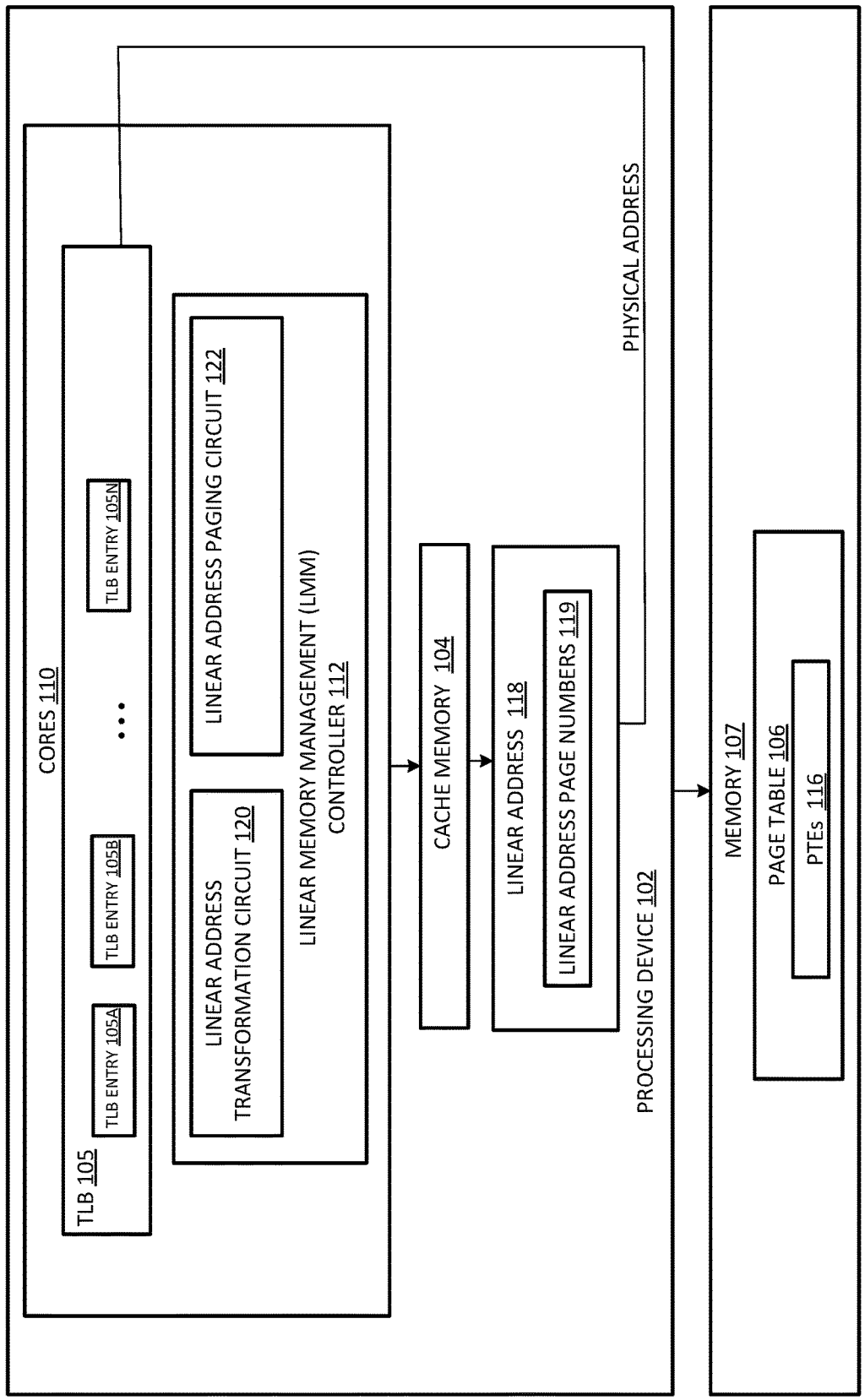
FIG. 1B illustrates a processing system according another implementation of the disclosure.

FIG. 1B illustrates a processing system 101 according to another implementation of the disclosure. The processing system 101 is similar to processing system 100 of FIG. 1A except the LMM controller 112 resides in the cores 110. As discussed above, the LMM controller 112 is a computer hardware component that handles all of the linear memory and caching operations associated with the processing device 102 as described in greater detail with reference to FIG. 1A above.

Figure 2:
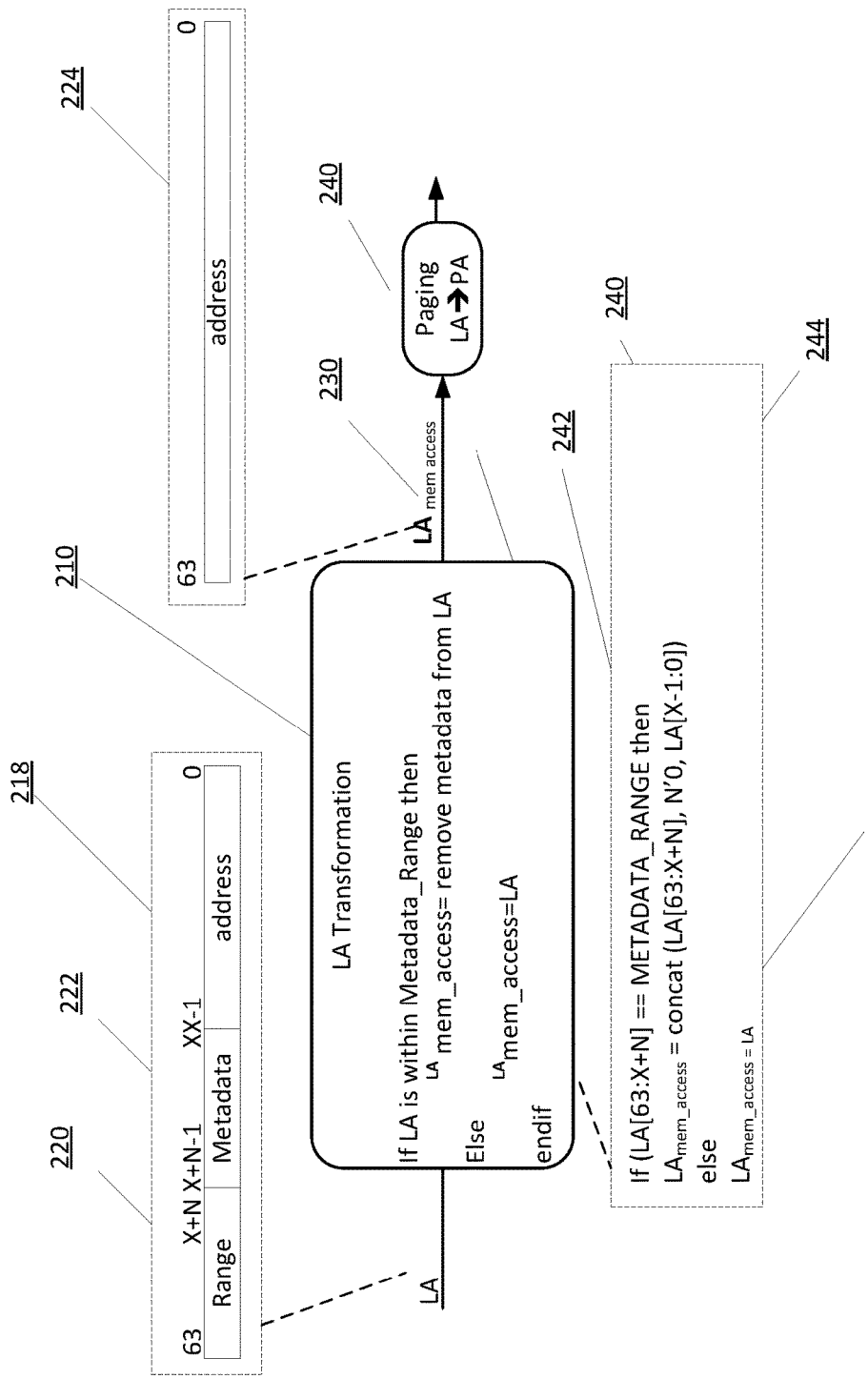
FIG. 2 illustrates a transformation of linear memory addresses according to an implementation of the disclosure.

FIG. 2 illustrates LA transformation 210 of a linear address (LA) or LA space 218 by the LAT circuit 120 in accordance with one implementation of the disclosure. In one implementation, the LA 218 is same as the LA 118 of FIG. 1A. The LA 218 is an address generated for a memory access (e.g., load or a store) of data in the memory. As illustrated, in an example in FIG. 2, the LA 218 includes 64 bits starting from 0 bit to 63 bit. LA 218 includes a range 220 of upper bits from bits 63 to X+N. As discussed above, these upper bits of range 220 indicate the linear address page number. Metadata_Range is a pre-defined (configurable) range of LA address page numbers, where bits X to X+N−1 of those pre-defined LA address page numbers are reserved for metadata (N bits of metadata). In the example illustrated in FIG. 2, it is assumed that a value (metadata value) stored in the linear address page number of range 220 in LA 218 falls within the predefined and configured Metadata_Range. As discussed above, the metadata value corresponds to plurality of metadata bits. Also, as discussed above, each of the plurality of metadata bits are used for the description of data stored in the LA and is not party of the memory addressing. As such, LA 218 includes the metadata bits 222 stored in the address bits X to X+N−1. Address 224 or LA (mem access) 230 is a resulting LA after an LA transformation 240 is applied to LA 218. LA (mem access) 230 is utilized for the memory access operation. LA(mem_acces) includes the address 224, which is defined as address bits in the range of 0 to 63 bits used for memory access after stripping of the metadata bits in the address bits X to X+N−1, as described below.

In one implementation, the LA transformation 240 includes determining whether any portion of the LA 218 includes a value that falls within the metadata range. If it is determined that a portion of the LA 218 includes the value that falls within the metadata range, then that value is identified as a metadata value and LAT circuit 120 removes each of the plurality of metadata bits corresponding to the metadata value and replaces each of the plurality of the metadata bits with a constant value (e.g., 0). The LA (mem access) 230 is the resulting LA 218 after metadata removal and replacement. If it is determined that the LA 218 does not include a value that falls within the metadata range, then the LA (mem access) 230 includes the entire LA 218.

Referring to FIG. 2, there is also shown a set of instructions 240 for LA transformation with respect to the LA 218. As discussed above, the LA 218 includes the range 220 of upper bits 63: X+N. In one implementation, the LAP circuit 120 checks if a value stored in the range 220, i.e. bits 63:X+N in the LA 218 falls within a pre-defined metadata-range Accordingly, a first instruction 242 in the set of instructions 240 include "If (LA[63:X+N]==METADATA_RANGE, then". In one implementation, if it is determined that the value stored in the range 220 of bits 63: X+N falls within the pre-defined metadata range, then the LAT circuit 120 identifies the value as metadata 222 and the corresponding bits (bits X to X+N−1) as metadata bits The identified metadata bits 222 are not used for translation from the LA to PA for TLB 105 paging. In one implementation, the LAT circuit 120 copies a constant value (e.g. zero of the MSB of the LA 218) onto the metadata bits 222, creating a new address 224 that will be used for paging. If the value stored in the range 220 of bits 63: X+N does not fall within the predefined metadata-range then the address 224 is used for paging, which will be equal to address 218 (no transformation will be applied) . . . . In one implementation, the LAT circuit 120 removes these identified metadata bits (bits X to X+N−1) in the LA space 218 and replaces them with a constant value.

In one implementation, all the bits in the LA space 218 except the identified metadata bits 222 in the LA space 218 are used for the LA(mem access) 230. As such, a second set of instructions 244 in the set of instructions 240 includes "LAmem_access=concat (LA [63: X+N], N' 0, LA[X−1:0])." If it is determined that the value stored in the range 220 does not fall within the metadata range 222, then the entire LA space 218 is used for LA(mem access) 230. Accordingly, a third set of instructions 246 in the set of instructions 240 includes "LAmem_access=LA."

Figure 3A:
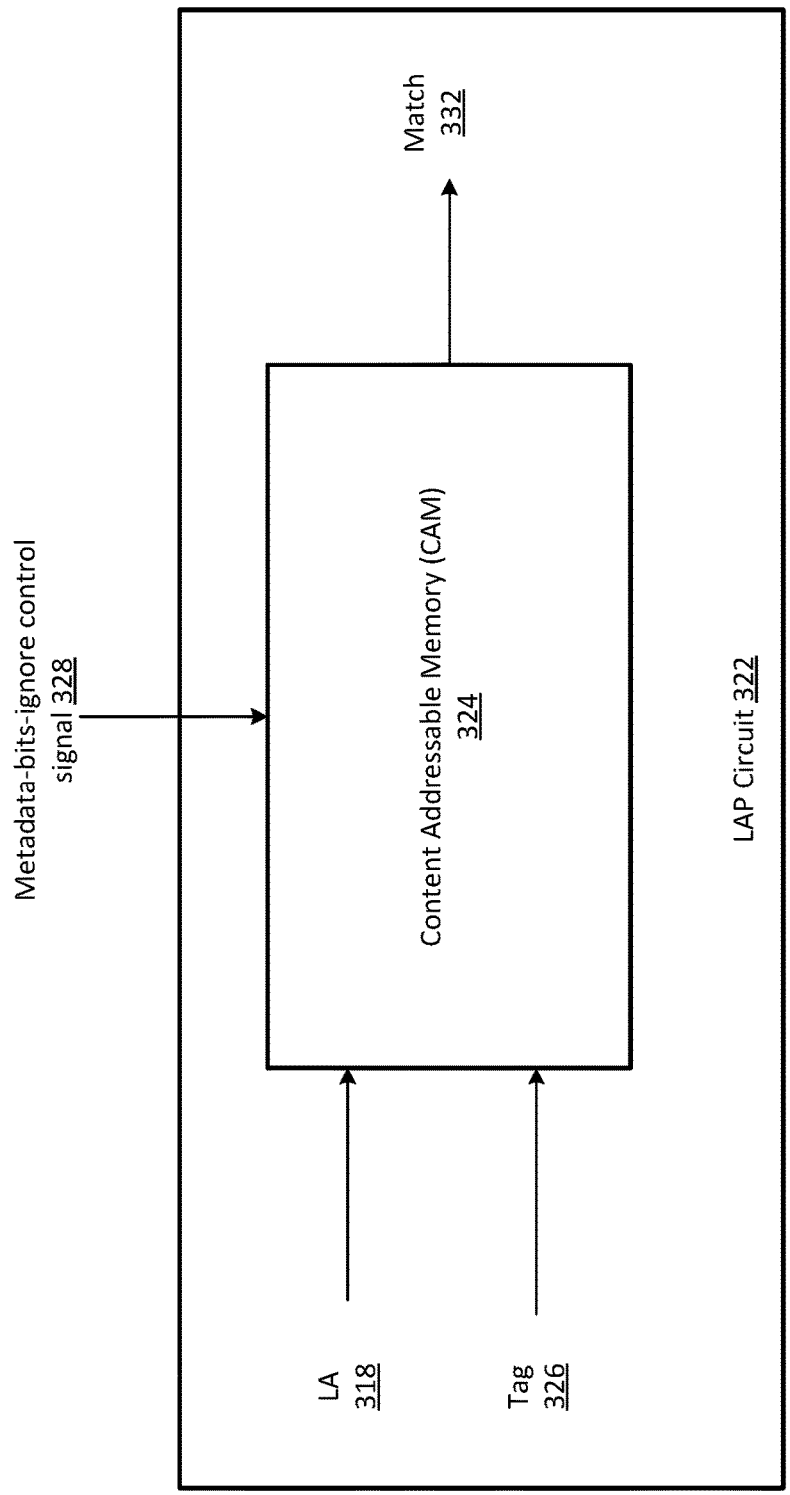
FIG. 3A illustrates a block diagram of linear memory paging circuit of the processing system according to an implementation of the disclosure.

FIG. 3A illustrates a block diagram of a LAP circuit 322 is utilized to ignore metadata bits in the LA 118 in accordance with the one implementation of the disclosure. The LAP circuit 322 may be same as the LAP circuit 122 of FIG. 1A.

In one implementation, the LAP circuit 322 includes a content addressable memory (CAM) 324 having inputs LA 318 and a tag 326 of a TLB entry among the plurality of TLB entries 105A-105N of the TLB 105. In one implementation, the LA 318 is same as the LA 118 of FIG. 1A and/or FIG. 1B. A CAM is a computer memory that operates similar to a hardware search engine for search-intensive applications. Specifically, the CAM searches for an address in the LA 318 based on the tag 326 of the TLB entry among the plurality of TLB entries 105A-105N to determine a match in order to convert the LA to PA. Each TLB entry among the plurality of TLB entries 105A-105N includes the tag 326 that provides an address space number (ASN) and a metadata status flag. Specifically, the CAM 324 searches for a portion of the address in the LA 318 that TLB 105 is paging based on the tag 326. In one implementation, the CAM 324 receives an input of a metadata-bits-ignore control signal 328. The metadata-bits-ignore control signal 328 refers to an indication to ignore the metadata bits corresponding to the metadata value stored in a portion in the address of the LA 318 when the metadata status flag in the TLB entry among the plurality of TLB entries 105A-105N is set. As discussed above, the metadata status flag includes a flag bit in the TLB entry among the plurality of TLB entries 105A-105N set to 1 when the metadata value stored in the portion of the address in the LA 318 of the TLB entry among the plurality of TLB entries 105A-105N falls within the pre-defined metadata range. In one implementation, the CAM 324 outputs a match 332, which states that the ASN in tag 326 of the TLB entry among the plurality of TLB entries 105A-105N matches with an address space of the LA 318 and excludes the corresponding metadata bits stored in the matched address space of the LA 318.

Figure 3B:
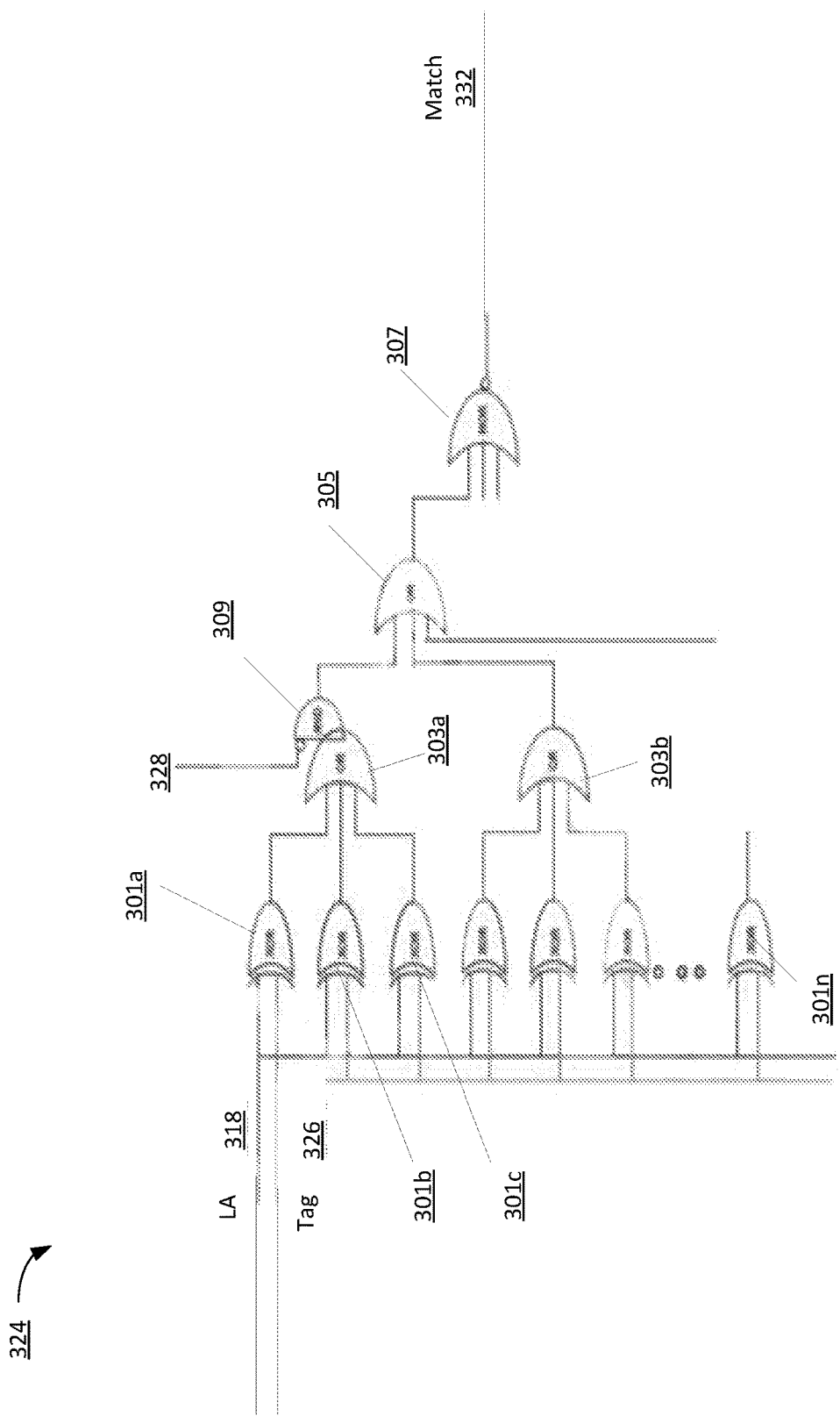
FIG. 3B illustrates an example of a logic diagram of content addressable memory of the linear memory paging circuit of FIG. 3A according to an implementation of the disclosure.

FIG. 3B illustrates an example of a logic diagram of the CAM 324 in accordance with one implementation of the disclosure. In one implementation, CAM 324 is the same as CAM 324 described with respect to FIG. 3A. As shown, the CAM 324 includes a plurality of first X-OR gates 301a-301n, second X-OR gates 303a and 303b, a third X-OR gate 305 and a fourth X-OR gate 307 and an AND gate 309. Each of the plurality of first X-OR gates 301a-301n receives a bit of the LA 318 and a bit of the tag 326 of a corresponding TLB entry among the plurality of TLB entries 105A-105N. In one implementation, the bits of the LA 318 received at the first X-OR gates 301a, 301b and 301c are the lower bits. Outputs of the first X-OR gates 301a, 301b and 301c, which are the lower bits of the LA 318 are inputted to the second X-OR gate 303a, which outputs a combination of the lower bits of the LA 318. The combination of the lower bits of the LA 318 are input to the AND gate 309. Another input to the AND gate 309 is metadata-bits-ignore control signal 328. In one implementation, the metadata-bits-ignore control signal 328 includes a value, which indicates to ignore the lower bits of the LA 318 of the TLB entry among the plurality of TLB entries 105A-105N of the TLB 105 paging that has the metadata status flag set. As discussed above, the TLB 105 that has its metadata status flag set when the TLB entry among the plurality of TLB entries 105A-105N of the TLB 105 pages the lower bits of the LA 318, which correspond to the metadata value that falls within a predefined metadata range. Also, as discussed above, these bits are identified as metadata bits.

In one example, the value of the metadata-bits-ignore control signal 328 is 0. Accordingly, the output of the AND gate 309 is 0, which indicates to ignore the metadata bits of the LA 318. The output of the AND gate 309 is an input to the third X-OR gate 305. Another input to the third X-OR gate 305 is the output of the second X-OR gate 303b, which includes bits of the LA 318 to be utilized for memory access. The output of the third X-OR gate 305 includes the bits of the LA 318 to be utilized for memory access, which is an input to the fourth X-OR gate 307, output of which is a match 332, which includes the address of the LA 318 excluding the address containing the metadata bits. This address of the LA 318 is utilized to convert the LA 318 to the PA for the TLB entry among the plurality of TLB entries 105A-105N of the TLB 105 paging.

In one implementation, the first XOR gates of 301a-301n are used to compare each bit of the looked up address with a bit in the TLB. The results of these first XOR gates 301a-301n are merged using a XOR tree including the third X-OR gate 305 and the fourth X-OR gate 307. In one implementation, all bits that may be ignored (as being metadata bits) go through the second XOR gate 303a and the AND gate 309 and the rest of the bits (which are not identified as metadata bits) go through a second XOR (303b). The results of combination of the second X-OR gate 303a and the AND gate 309 and the result of the second XOR gate 303b go through the XOR tree (as denoted in the example as the third X-OR gate 305 and the fourth X-OR gate 307). As shown, the fourth X-OR gate 307 will have a NOT to provide '1' for a match 332 and '0' for no-match In one implementation, logic diagram of the CAM 324 is an example of a TLB CAM structure that can be used to ignore some bits if these bits were used for metadata. In the example shown the metadata bits are those that go into the first X-OR gates 301a to 301c, which is part of the CAM comparison only if they were not used for metadata (based on the metadata-bits-ignore signal 328). The rest of the bits are always used for the comparison. In one implementation, this mechanism can be extended to any number of bits to be used as metadata.

Figure 4A:
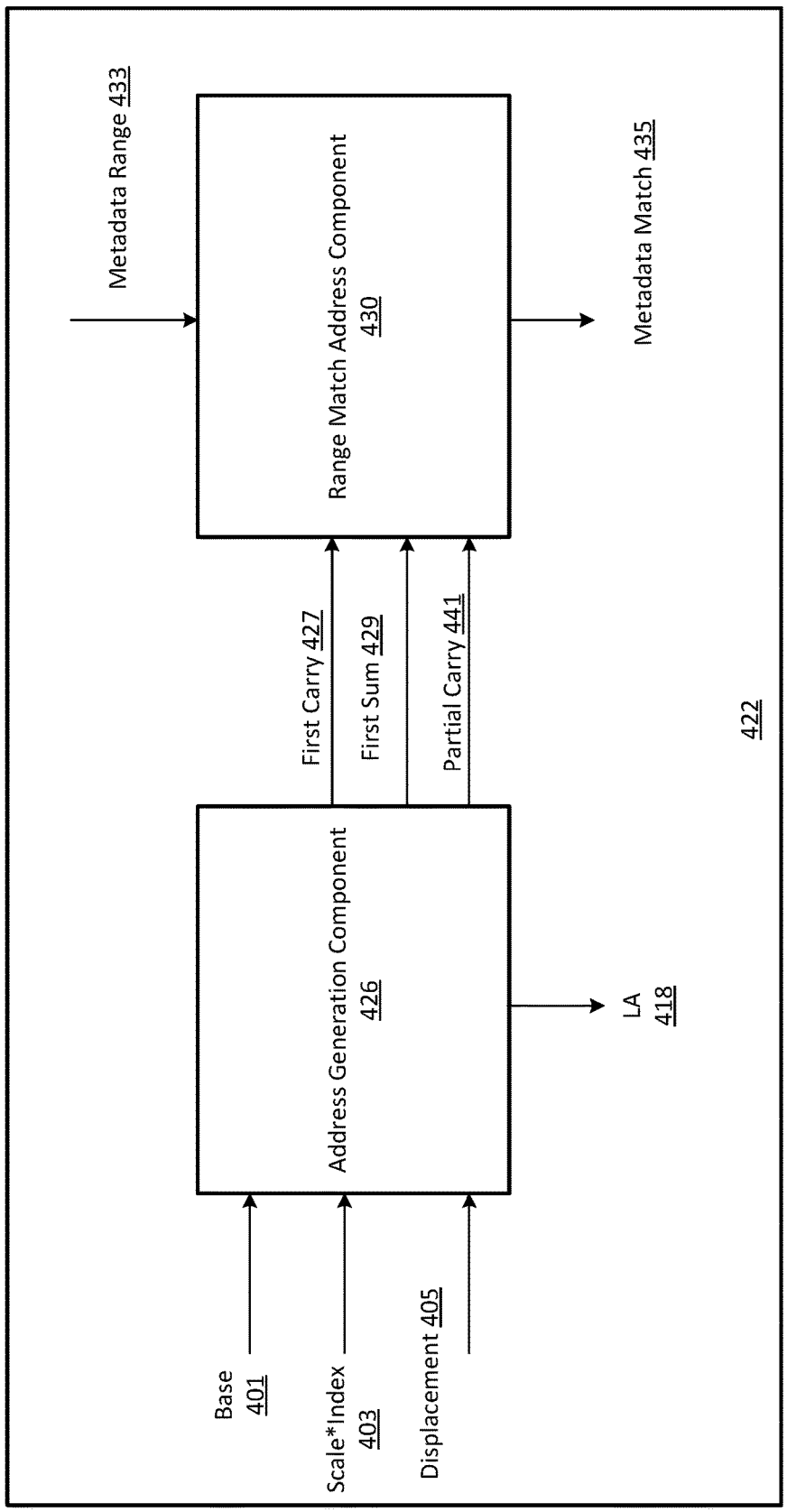
FIG. 4A illustrates a block diagram of linear memory paging circuit of the processing system according to an implementation of the disclosure.

FIG. 4A illustrates a block diagram of a LAP circuit 422 to ignore metadata bits at the same time that the LA 118 is being generated in accordance with the one implementation of the disclosure. The LAP circuit 422 may be same as the LAP circuit 122 of FIG. 1A and/or FIG. 1B. In one implementation, the LAP circuit 422 receives inputs of a pre-defined metadata range 433, base 401, a scale*index 403 and a displacement 405 of a load/store instruction to load/store data in the memory. In one implementation, the pre-defined metadata range 433 is same as the Metadata_Range in 242 of FIG. 2. The base 401 identifies which register will be used to calculate the actual memory location. The scale*index 403 identifies a register with a scaling factor and the displacement 405 is a constant value added to the address. The LAP circuit 422 includes an address generation circuit 426 which receives the base 401, the scale*index 403 and the displacement 405 to generate LA 418. In one implementation, the LA 418 is same as the LA 118 of FIG. 1A and/or FIG. 1B. The address generation circuit 426 outputs a first carry 427 and a first sum 429 and a partial carry 441. In one implementation, the first carry 427 and first sum 429 are bit vectors of sum and carry of the summation of each bit in the three inputs done individually (bit j of first carry and first sum is the carry and sum of adding bit j of base, bit j of index*scale and bit j of displacement). The LAP circuit 422 also includes a range match address circuit 430, which receives the pre-defined metadata range 433 and the first carry 427, the first sum and the partial carry 441 to generate a metadata match 435, which causes the LAP circuit 422 to generate a metadata-bits-ignore control signal at the same time the LA 118 is being generated. In one implementation, the metadata match 435 occurs when a value (metadata value) stored in any portion of the LA 418 being generated falls within the pre-defined metadata range. As discussed above, the metadata value corresponds to the plurality of metadata bits. In one implementation, the metadata-bits-ignore control signal is sent to the CAM at the same time the LA 418 is being generated.

Figure 4B:
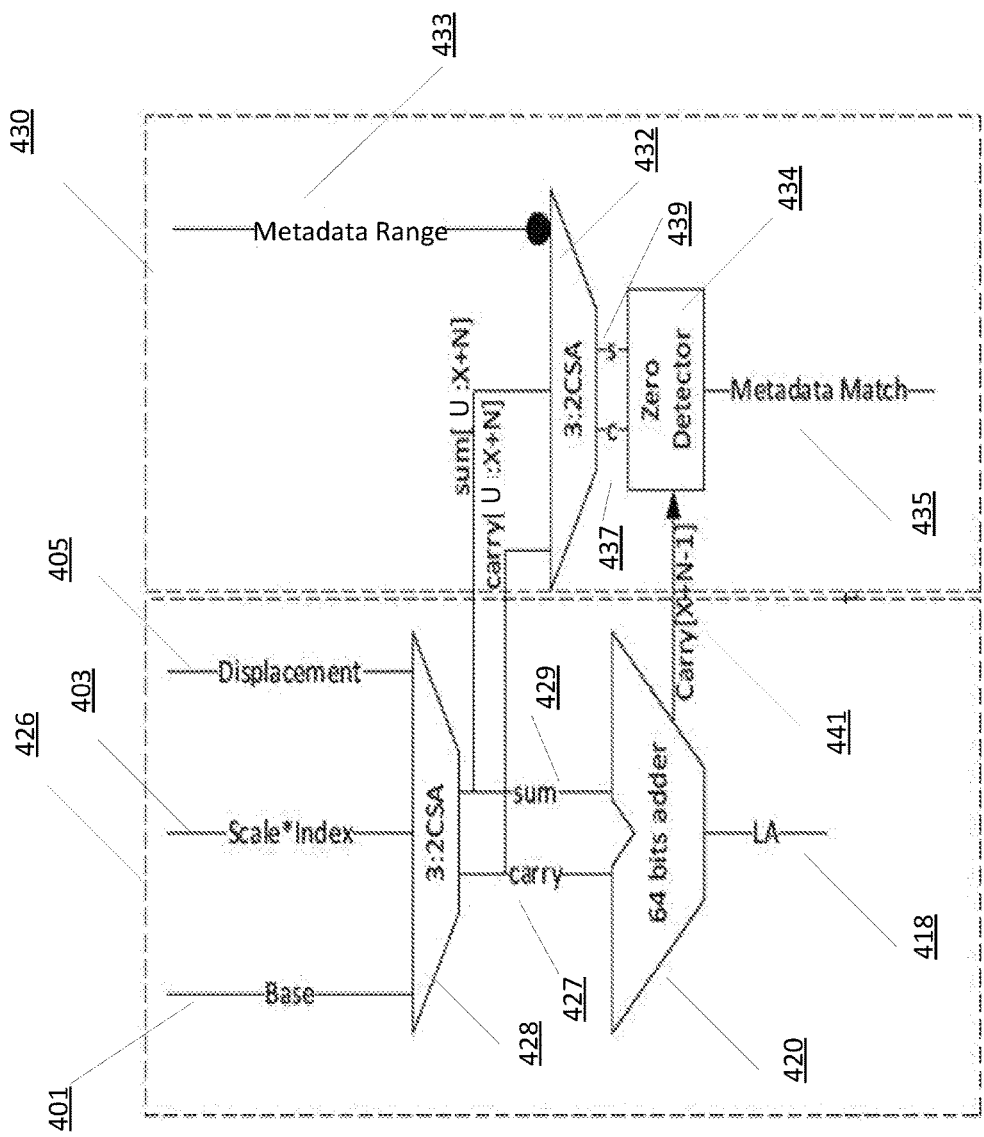
FIG. 4B illustrates an example of a logic diagram of the linear memory paging circuit of FIG. 4A according to an implementation of the disclosure.

FIG. 4B illustrates an example of a logic diagram of the LAP circuit 422 in accordance with one implementation of the disclosure. As shown in FIG. 4B, the LAP circuit 422 includes the address generation circuit 426 and the range match address circuit 430. The address generation circuit 426 includes a first 3:2 carry sum adder (CSA) 428 and a 64 bits adder 420. The range match address circuit 430 includes a second 3:2 CSA 432 and a zero detector 434.

Inputs to the first 3:2 CSA 428 include the base 401, the scale*index 403 and the displacement 405. The output of the first 3:2 CSA 428 includes a first carry 427 and a first sum 429, both of which are inputted to the 64 bits adder 420 and the second 3:2 CSA 432 at a same time. Another input to the second 3:2 CSA 432 includes the pre-defined metadata range 433. The output of the second 3:2 CSA 432 includes a second carry 437 and a second sum 439. The second carry 437 and the second sum 439 include upper bits U: X+N. In one implementation, the upper bits U: X+N are the same as 63: X+N of the LA 118 as defined in FIG. 2 above. A partial carry 441 is outputted from the 64 bits adder 420. The partial carry 441 represents bits, X+N−1 of the LA 118, which are the lower bits occurring immediately after the upper bits U:X+N of the LA 118. The LA 118 is not fully generated as an output of the 64 bits adder 420 at this time. The second carry 437, the second sum 439 and the partial carry 441 are inputted into the zero detector 434 at the same time. The zero detector 424 determines whether the bits X+N−1 of the partial carry 441 in the LA 118 are within the pre-defined metadata range 433. If the metadata value stored in the address bits X+N−1 of the partial carry 441 in the LA 118 is determined to be within the pre-defined metadata range 433, then those these bits X+N−1 are identified as metadata bits. The zero detector 424 outputs the metadata match 435 at the same time the LA 418 is being generated. As such, the linear address may not be completely generated at this time. The metadata match 435 causes the LAP circuit 422 to generate the metadata-bits-ignore control signal 328. Accordingly, the metadata-bits-ignore control signal 328 is generated parallel to generating of the LA 418.

Figure 4C:
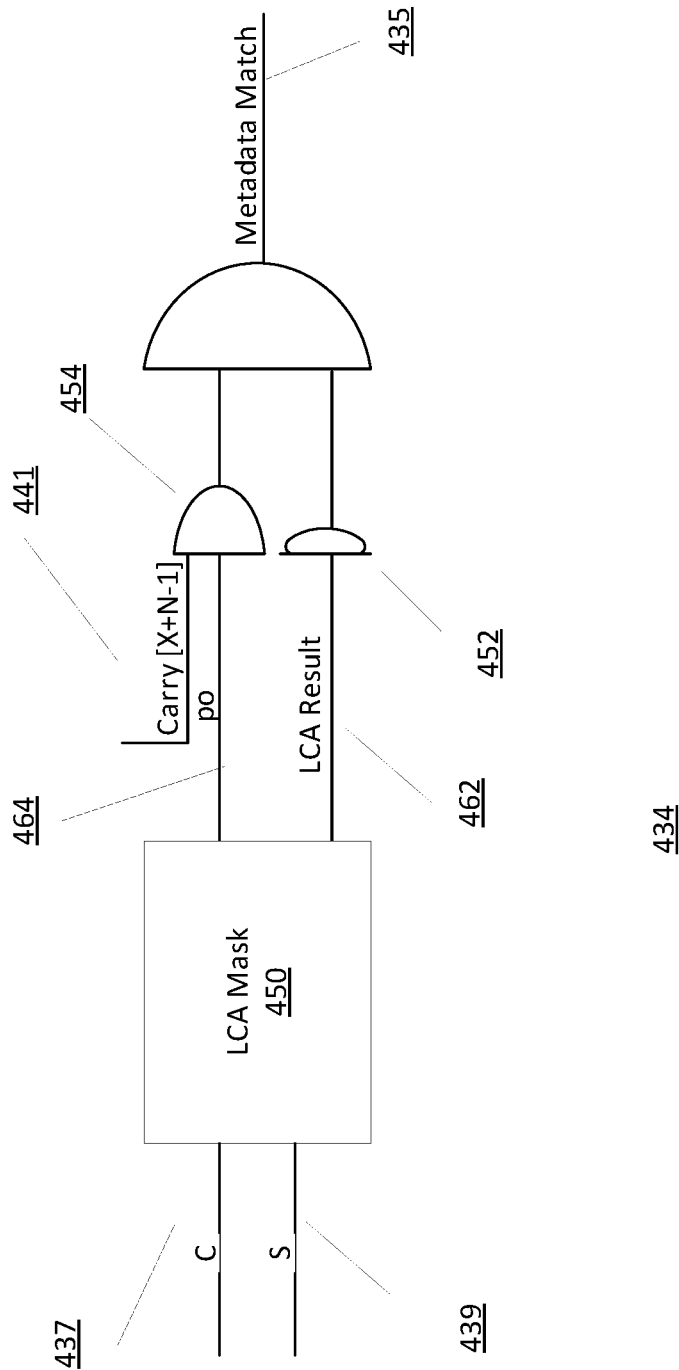
FIG. 4C illustrates an example of a logic diagram of the zero detector of FIG. 4B in accordance to an implementation of the disclosure.

FIG. 4C illustrates an example of a logic diagram of the zero detector 434 of FIG. 4B in accordance to an implementation of the disclosure. The zero detector 434 includes a lead change anticipator (LCA) mask 450, an X-OR gate 452, a first AND gate 454, a first AND gate 456 and a second AND gate 458. Inputs to the LCA mask 450 include the second sum 437 and the second carry 439. In one implementation, the LCA mask 450 includes logic to anticipates leading "1"s or "0"s and outputs a LCA result 462 and a p0 464. The LCA result 462 is an input to the first AND gate 464. The p0 464 and the partial carry are inputs to the second AND gate 454. In one implementation, the LCA result 462 is all "1" (i.e. no change) and the partial carry 441 has same result as the p0 464 (i.e. result is '0' and no partial carry 441, or result is negative and the partial carry 441 equals to 1). Accordingly, the output of the first AND gate 454 is 0 and the output of the X-OR gate 452 is 1, which are inputs to the second AND gate 458 resulting in an output of "0, which generates the metadata match 435. As discussed above, the metadata match 435 causes the LAP circuit 422 to generate a metadata-bits-ignore control signal at the same time the LA 118 is being generated.

Figure 5:
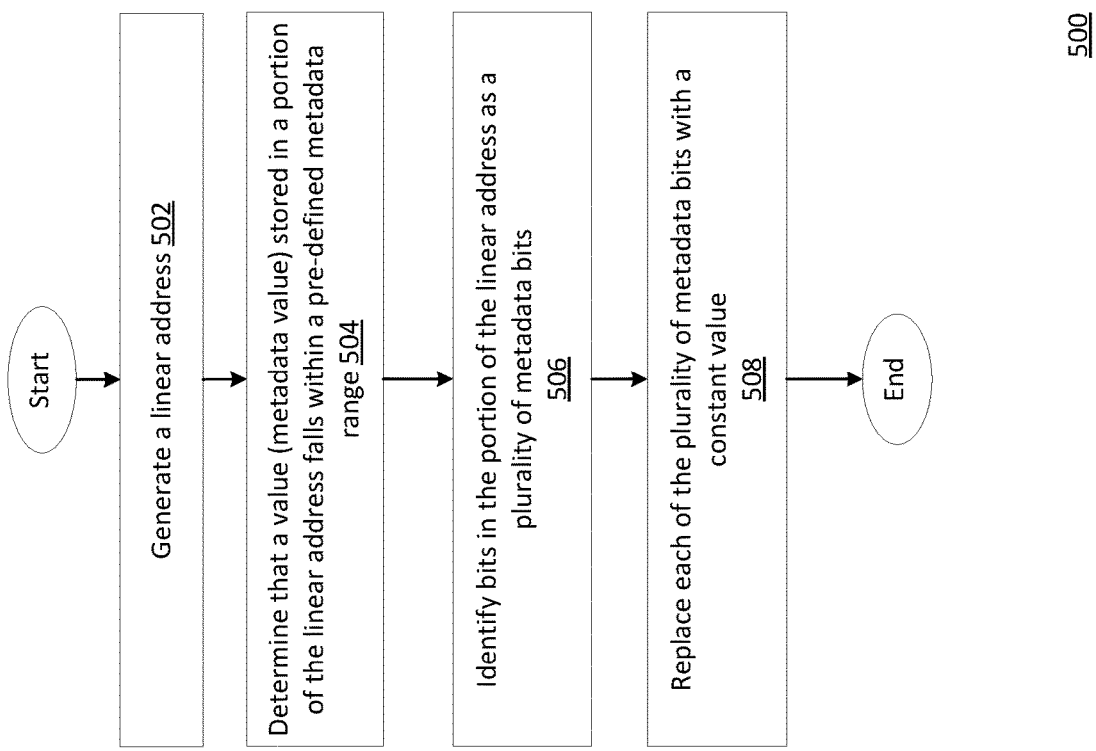
FIG. 5 illustrates a flow diagram of a method for transforming linear memory according to an implementation of the disclosure.

FIG. 5 is a flow diagram of a method 500 for transforming linear memory according to an implementation of the disclosure. Method 500 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one implementation, method 500 may be performed, in part, by the LAT circuit 120 of the LMM controller 112 of the processing device 102 as shown in FIG. 1A and/or FIG. 1B.

For simplicity of explanation, the method 500 is depicted and described as a series of acts. However, acts in accordance with this disclosure can occur in various orders and/or concurrently and with other acts not presented and described herein. Furthermore, not all illustrated acts may be performed to implement the method 500 in accordance with the disclosed subject matter. In addition, those skilled in the art will understand and appreciate that the method 500 could alternatively be represented as a series of interrelated states via a state diagram or events.

For simplicity of explanation, the method 500 is depicted and described as a series of acts. However, acts in accordance with this disclosure can occur in various orders and/or concurrently and with other acts not presented and described herein. Furthermore, not all illustrated acts may be performed to implement the method 500 in accordance with the disclosed subject matter. In addition, those skilled in the art will understand and appreciate that the method 500 could alternatively be represented as a series of interrelated states via a state diagram or events.

Method 500 begins at block 502 where a linear address is generated. In one implementation, the linear address is generated for memory access task. At block 504, it is determined that a value (metadata value) stored in a portion of the linear address falls within a pre-defined metadata range. As discussed above, a metadata range is a range of memory in which some bits are reserved for metadata and the rest of the memory does not have any bits reserved for metadata. At block 506, bits in the portion of the address are identified as a plurality of metadata bits. As discussed above, each of the plurality of metadata bits are used for description of data stored at the linear address that are not part of memory addressing. In one implementation, the bits in the portion of the address identified as metadata bits are lower bits.

Subsequently, at block 508, each of the plurality of metadata bits are replaced with a constant value (e.g., value of zero). In one implementation, each of the plurality of metadata bits are replaced with the constant value in response to a miss by a TLB paging a portion of the physical address corresponding to the portion of the linear address, which includes the metadata value that falls within the pre-defined metadata range.

Figure 6:
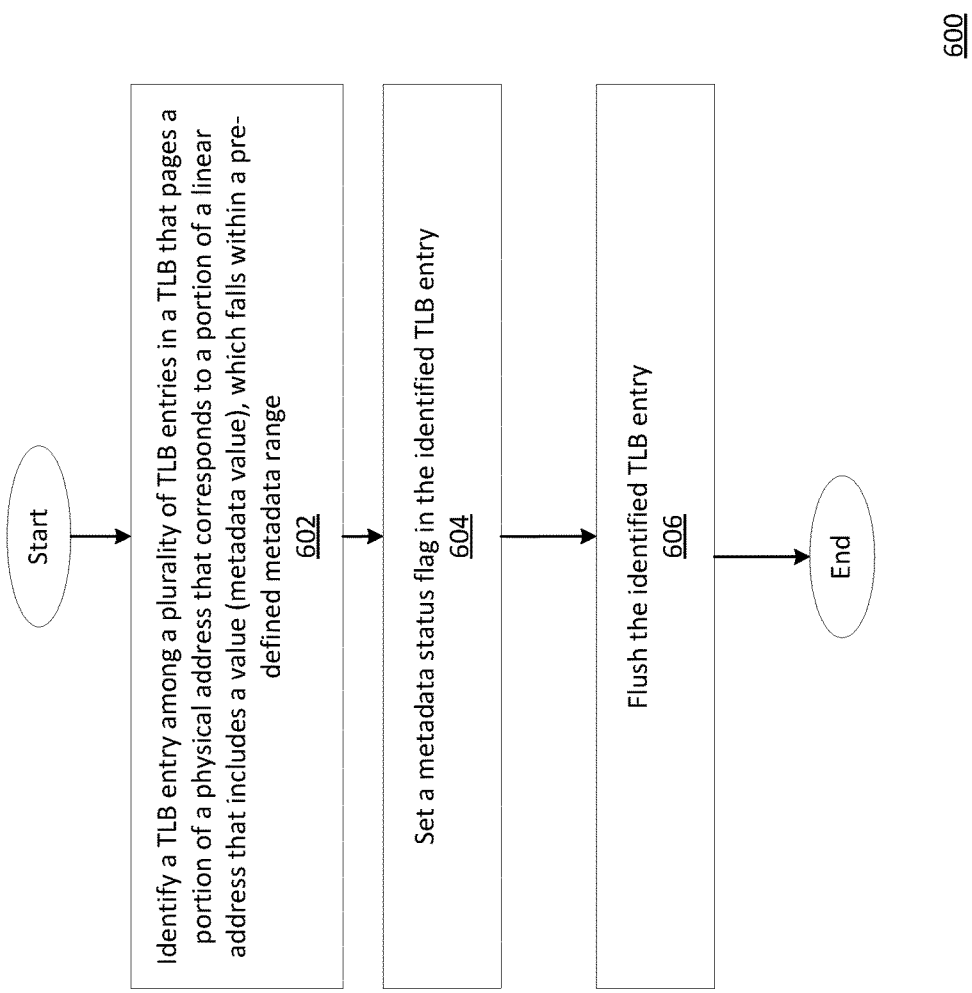
FIG. 6 illustrates a flow diagram of a method for managing linear memory according to an implementation of the disclosure.

FIG. 6 is a flow diagram of a method 600 for managing linear memory according to an implementation of the disclosure. Method 600 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one implementation, method 600 may be performed, in part, by the LAP circuit 122 of the LMM controller 112 of the processing device 102 as shown in FIG. 1A and/or FIG. 1B.

For simplicity of explanation, the method 600 is depicted and described as a series of acts. However, acts in accordance with this disclosure can occur in various orders and/or concurrently and with other acts not presented and described herein. Furthermore, not all illustrated acts may be performed to implement the method 600 in accordance with the disclosed subject matter. In addition, those skilled in the art will understand and appreciate that the method 600 could alternatively be represented as a series of interrelated states via a state diagram or events.

Method 600 begins at block 602 where a TLB entry among a plurality of TLB entries of a TLB is identified that pages a portion of the physical address corresponding to a portion of the linear address that includes a value (metadata value), which falls within a pre-defined metadata range. The physical address is a translation of the linear address. As discussed above, a pre-defined metadata range is a range of memory in which some bits are reserved for metadata and the rest of the memory does not have any bits reserved for metadata. In one implementation, the bits in the portion of the linear address are identified as a plurality of metadata bits. As discussed above, each of the plurality of metadata bits are used for description of data stored at the linear address that are not part of memory addressing. In one implementation, the bits in the portion of the linear address identified as plurality of metadata bits are lower bits.

At block 604, a metadata status flag in the identified TLB entry is set. At block 606, the identified TLB entry is flushed. Accordingly, it is initially assured that the TLB does not include any TLB entry that pages a portion of the physical address, which corresponds to the portion of the linear address as having metadata in a pre-defined metadata range.

Figure 7:
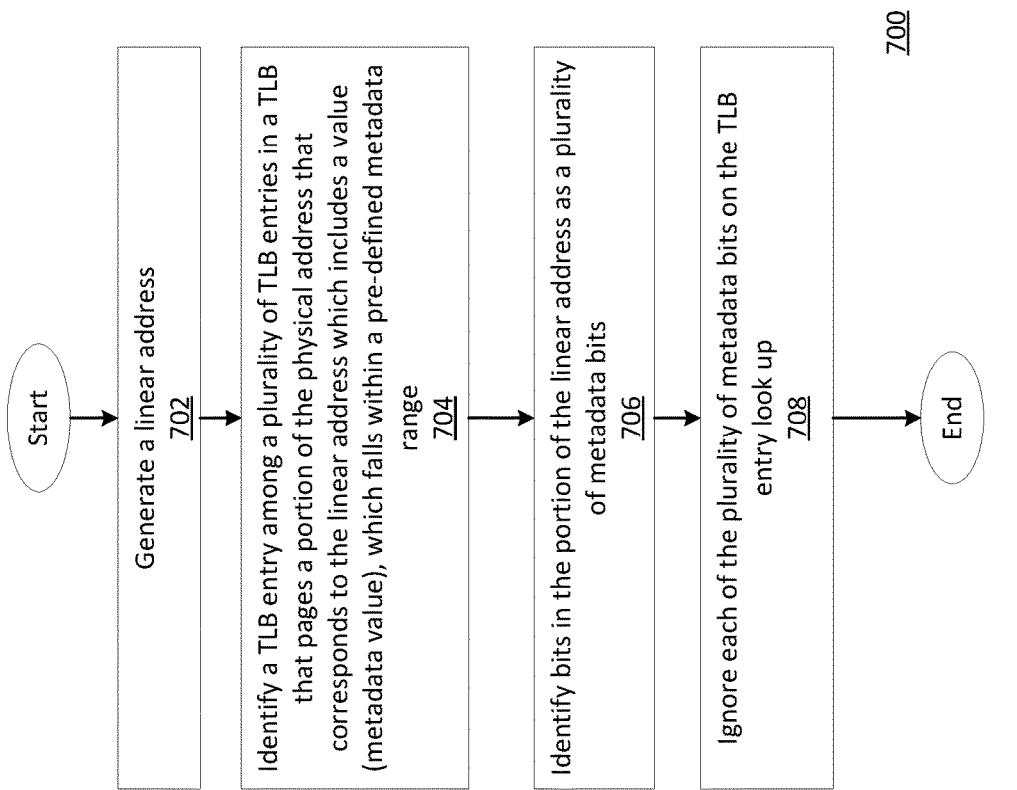
FIG. 7 illustrates a flow diagram of a method for managing linear memory according to an implementation of the disclosure.

FIG. 7 is a flow diagram of a method 700 for managing linear memory according to an implementation of the disclosure. Method 700 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one implementation, method 700 may be performed, in part, by the LAP circuit 122 of the LMM controller 112 of the processing device 102 as shown in FIG. 1A and/or FIG. 1B.

For simplicity of explanation, the method 700 is depicted and described as a series of acts. However, acts in accordance with this disclosure can occur in various orders and/or concurrently and with other acts not presented and described herein. Furthermore, not all illustrated acts may be performed to implement the method 700 in accordance with the disclosed subject matter. In addition, those skilled in the art will understand and appreciate that the method 700 could alternatively be represented as a series of interrelated states via a state diagram or events.

Method 700 begins at block 702 where a linear address is generated. At block 704, A TLB entry among a plurality of TLB entries of a TLB is identified that pages a portion of the physical address corresponding to a portion of the linear address that includes a value (metadata value), which falls within a pre-defined metadata range. The physical address is a translation of the linear address. As discussed above, a pre-defined metadata range is a range of memory in which some bits are reserved for metadata and the rest of the memory does not have any bits reserved for metadata. At block 706, bits in the portion of the linear address are identified as a plurality of metadata bits. As discussed above, each of the plurality of metadata bits are used for description of data stored at the linear address that are not part of memory addressing. In one implementation, the bits in the linear address identified as metadata bits are lower bits. At block 708, each of the plurality of metadata bits on the TLB entry lookup are ignored. In one implementation, each of the plurality of metadata bits is replaced by a constant value.

Figure 8:
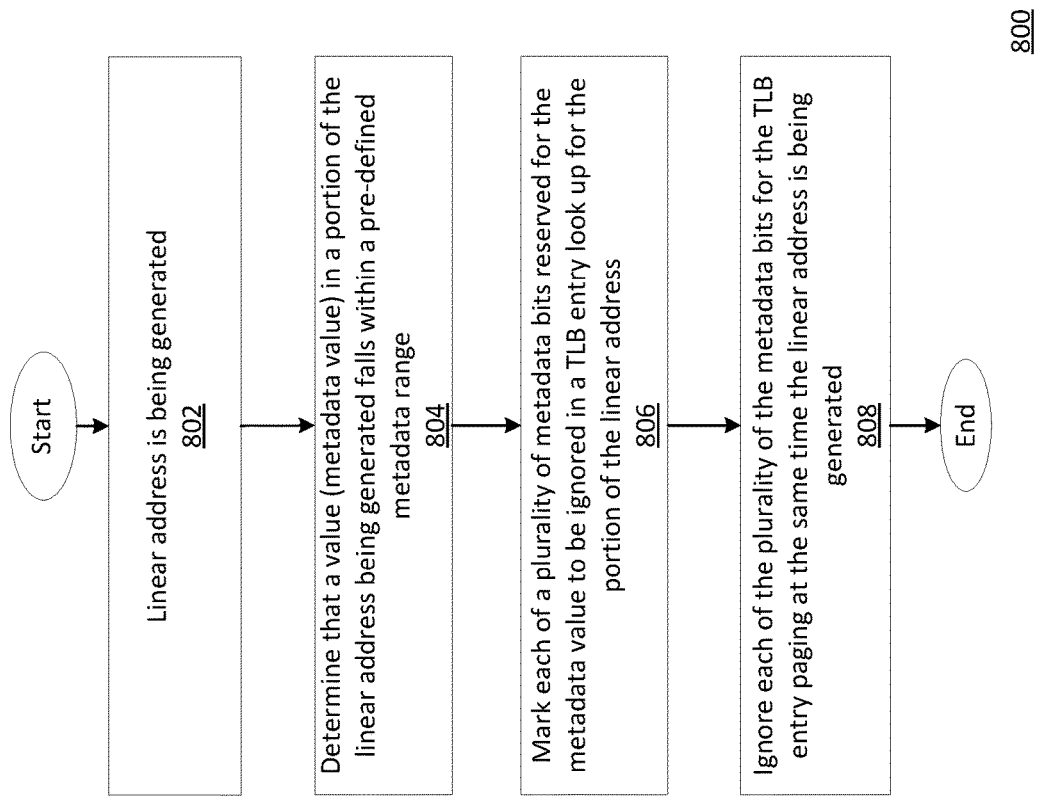
FIG. 8 illustrates a flow diagram of a method for managing linear memory according to an implementation of the disclosure.

FIG. 8 is a flow diagram of a method 800 for managing linear memory according to an implementation of the disclosure. Method 800 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one implementation, method 800 may be performed, in part, by the LAP circuit 122 of the LMM controller 112 of the processing device 102 as shown in FIG. 1A and/or FIG. 1B.

For simplicity of explanation, the method 800 is depicted and described as a series of acts. However, acts in accordance with this disclosure can occur in various orders and/or concurrently and with other acts not presented and described herein. Furthermore, not all illustrated acts may be performed to implement the method 800 in accordance with the disclosed subject matter. In addition, those skilled in the art will understand and appreciate that the method 800 could alternatively be represented as a series of interrelated states via a state diagram or events.

Method 800 begins at block 802 where a linear address is being generated. At block 804, it is determined that a value (metadata value) in a portion of the linear address being generated falls within a pre-defined metadata range. At block 806, each of a plurality of metadata bits reserved for the metadata value are marked to be ignored in a TLB entry lookup for the portion of the linear address. As discussed above, bits in the portion of the linear address are identified as a plurality of metadata bits. Also as discussed above, each of the plurality of metadata bits are used for description of data stored at the linear address that are not part of memory addressing. In one implementation, the bits in the linear address identified as metadata bits are lower bits. At block 808, each of the plurality of the metadata bits for a TLB entry paging are ignored at the same time the linear address is being generated. In one implementation, each of the plurality of the metadata bits is replaced by a constant value.

Figure 9A:
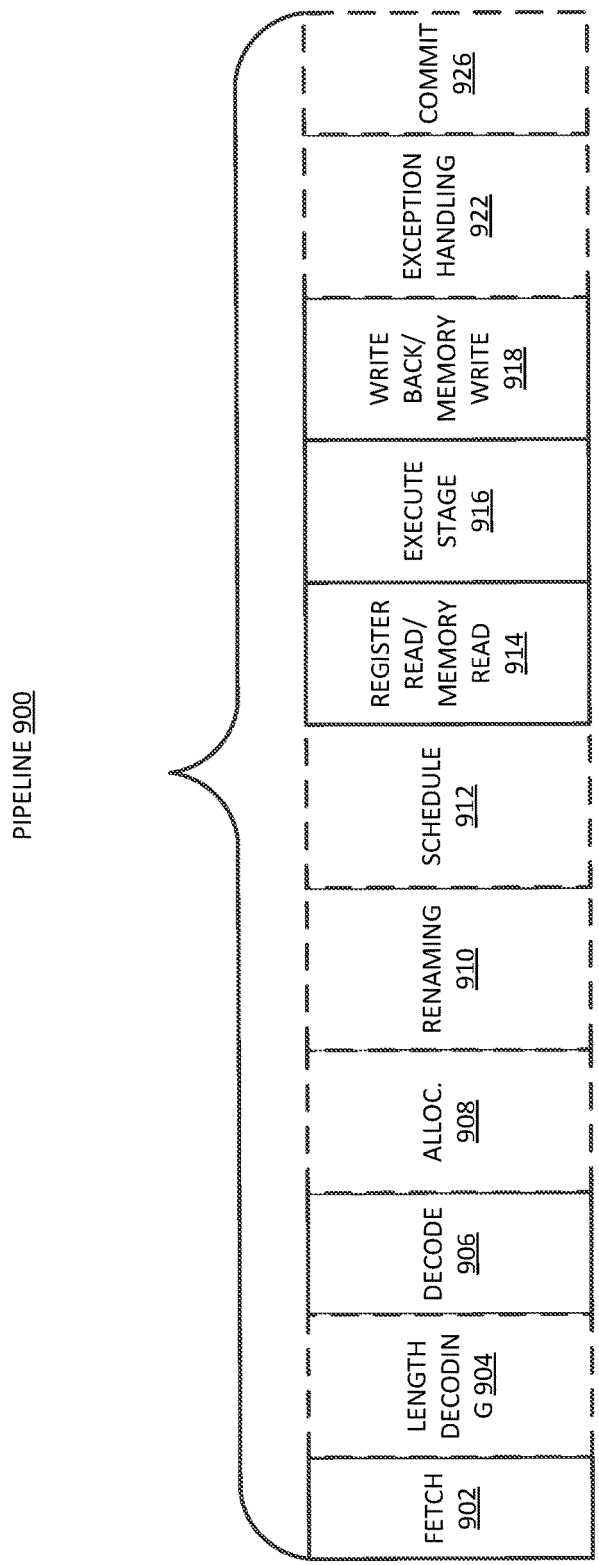
FIG. 9A is a block diagram illustrating a micro-architecture for a processor in which one implementation of the disclosure may be used.
Figure 9B:
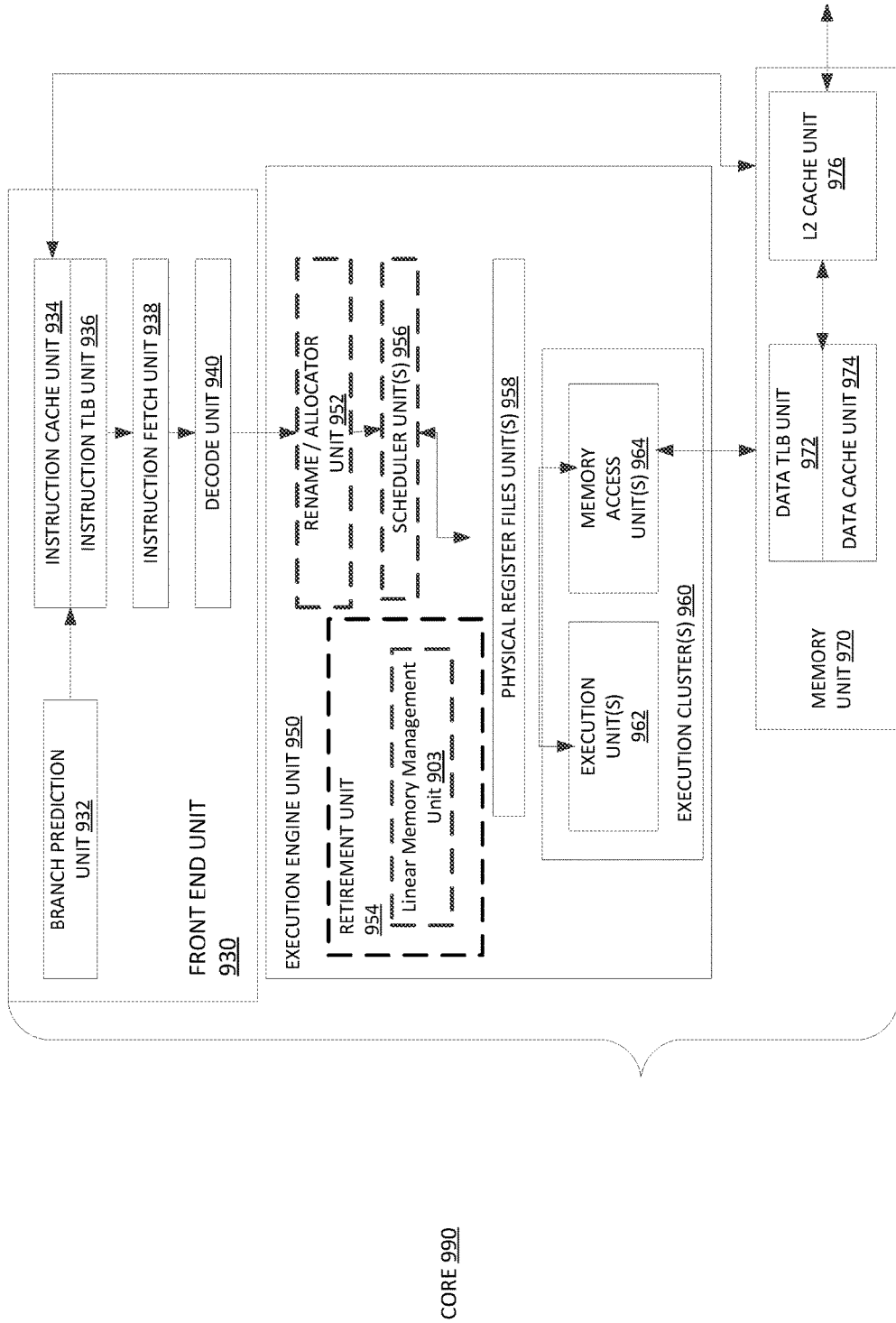
FIG. 9B is a block diagram illustrating an in-order pipeline and a register renaming stage, out-of-order issue/execution pipeline implemented according to at least one implementation of the disclosure.

FIG. 9A is a block diagram illustrating an in-order pipeline and a register re-naming stage, out-of-order issue/execution pipeline of a processor monitoring performance of a processing device to manage non-precise events according to at least one implementation of the invention. FIG. 9B is a block diagram illustrating an in-order architecture core and a register renaming logic, out-of-order issue/execution logic to be included in a processor according to at least one implementation of the invention. The solid lined boxes in FIG. 9A illustrate the in-order pipeline, while the dashed lined boxes illustrate the register renaming, out-of-order issue/execution pipeline. Similarly, the solid lined boxes in FIG. 9B illustrate the in-order architecture logic, while the dashed lined boxes illustrate the register renaming logic and out-of-order issue/execution logic.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 926. In some implementations, the stages are provided in a different order and different stages may be considered in-order and out-of-order.

In FIG. 9B, arrows denote a coupling between two or more units and the direction of the arrow indicates a direction of data flow between those units. FIG. 9B shows processor core 990 including a front end unit 930 coupled to an execution engine unit 950, and both are coupled to a memory unit 970.

The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, graphics core, or the like.

The front end unit 930 includes a branch prediction unit 932 coupled to an instruction cache unit 934, which is coupled to an instruction translation lookaside buffer (TLB) unit 936, which is coupled to an instruction fetch unit 938, which is coupled to a decode unit 940. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 934 is further coupled to a level 2 (L2) cache unit 976 in the memory unit 970. The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The retirement unit 954 may include a linear memory management unit 903 according to implementations of the invention. The scheduler unit(s) 956 represents any number of different schedulers, including reservation stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 958 is overlapped by the retirement unit 954 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 956, physical register file(s) unit(s) 958, and execution cluster(s) 960 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 964). It should also be understood that where separate pipelines are used, one or more of these pipelines may be out-of-order issue/execution and the rest in-order.

The memory access unit(s) 964 is/are coupled to the memory unit 970, which includes a data TLB unit 972 coupled to a data cache unit 974 coupled to a level 2 (L2) cache unit 976. In one exemplary implementation, the memory access units 964 may include a load unit, a store address unit, and a store data unit, each of which is coupled to the data TLB unit 972 in the memory unit 970. The L2 cache unit 976 is coupled to one or more other levels of cache and eventually to a main memory.

By way of example, referring to FIGS. 9A and 9B, the exemplary register renaming, out-of-order issue/execution core architecture may implement the pipeline 900 as follows: 1) the instruction fetch unit 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instruction sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated implementation of the processor also includes a separate instruction and data cache units 934/974 and a shared L2 cache unit 976, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 10:
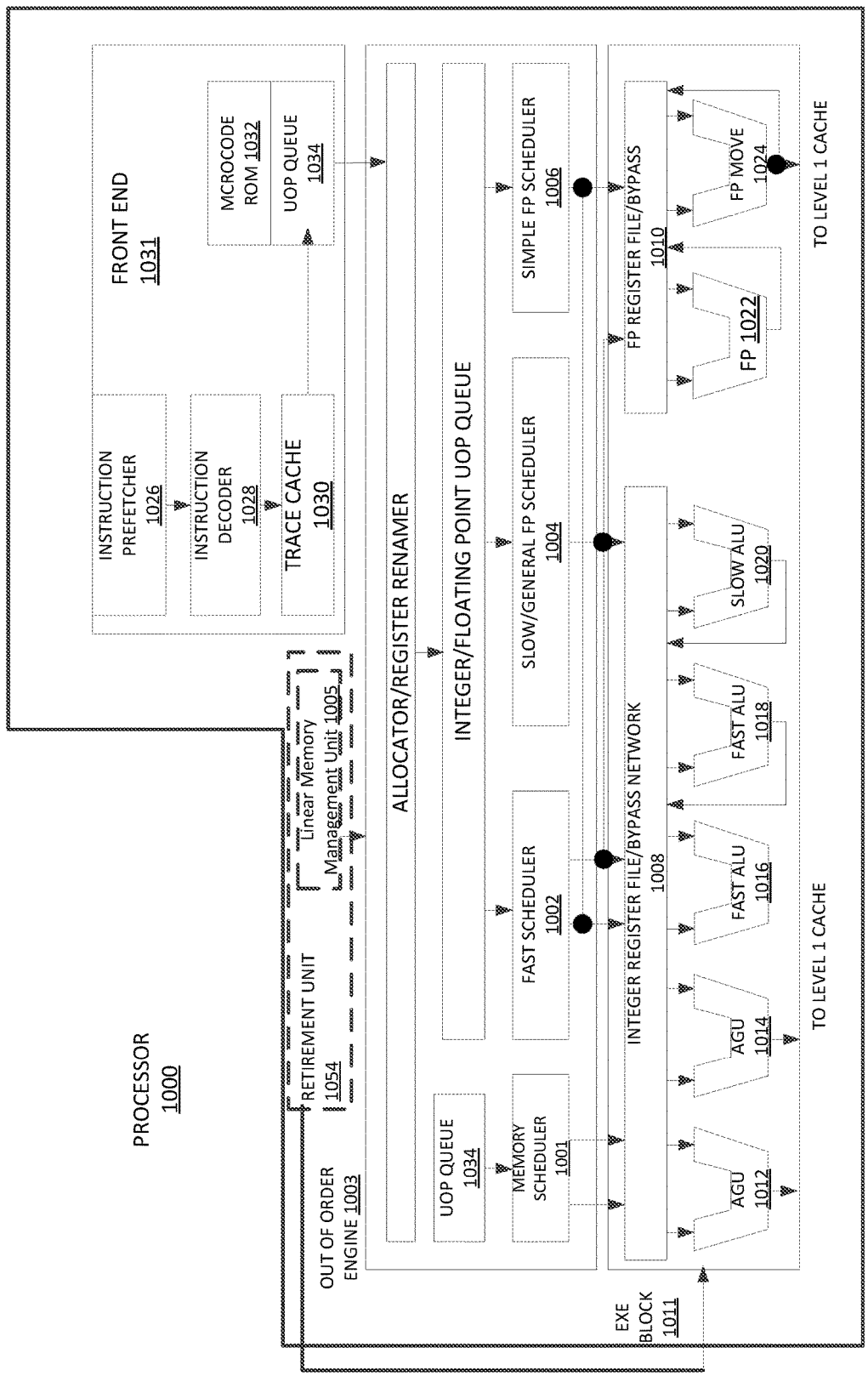
FIG. 10 illustrates a block diagram of the micro-architecture for a processor in accordance with one implementation of the disclosure.

FIG. 10 is a block diagram illustrating a micro-architecture for a processor 1000 that includes logic circuits to perform instructions in accordance with one implementation of the invention. In one implementation, processor 1000 monitors performance of a processing device to manage non-precise events. In some implementations, an instruction in accordance with one implementation can be implemented to operate on data elements having sizes of byte, word, doubleword, quad word, etc., as well as datatypes, such as single and double precision integer and floating point datatypes. In one implementation the in-order front end 1031 is the part of the processor 1000 that fetches instructions to be executed and prepares them to be used later in the processor pipeline. The front end 1031 may include several units. In one implementation, the instruction prefacer 1026 fetches instructions from memory and feeds them to an instruction decoder 1028, which in turn decodes or interprets them. For example, in one implementation, the decoder decodes a received instruction into one or more operations called "micro-instructions" or "micro-operations" (also called micro op or uops) that the machine can execute.

In other implementations, the decoder parses the instruction into an opcode and corresponding data and control fields that are used by the micro-architecture to perform operations in accordance with one implementation. In one implementation, the trace cache 1030 takes decoded uops and assembles them into program ordered sequences or traces in the uop queue 1034 for execution. When the trace cache 1030 encounters a complex instruction, the microcode ROM 1032 provides the uops needed to complete the operation.

Some instructions are converted into a single micro-op, whereas others use several micro-ops to complete the full operation. In one implementation, if more than four micro-ops are needed to complete an instruction, the decoder 1028 accesses the microcode ROM 1032 to do the instruction. For one implementation, an instruction can be decoded into a small number of micro ops for processing at the instruction decoder 1028. In another implementation, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one implementation from the micro-code ROM 1032. After the microcode ROM 1032 finishes sequencing micro-ops for an instruction, the front end 1031 of the machine resumes fetching micro-ops from the trace cache 1030.

The out-of-order execution engine 1003 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, 1001 fast scheduler 1002, slow/general floating point scheduler 1004, and simple floating point scheduler 1006. The uop schedulers 1001, 1002, 1004, and 1006 determine when a uop is ready to execute based on the readiness of their dependent input register operand sources and the availability of the execution resources the uops use to complete their operation. The fast scheduler 1002 of one implementation can schedule on each half of the main clock cycle while the other schedulers can schedule once per main processor clock cycle. The schedulers arbitrate for the dispatch ports to schedule uops for execution.

Register files 1008, 1010 sit between the schedulers 1001, 1002, 1004, 1006, and the execution units 1012, 1014, 1016, 1018, 1020, 1022, and 1024 in the execution block 1011. There is a separate register file for integer and floating point operations, respectively. Each register file 1008, 1010, of one implementation also includes a bypass network that can bypass or forward just completed results that have not yet been written into the register file to new dependent uops. The integer register file 1008 and the floating point register file 1010 are also capable of communicating data with the other. For one implementation, the integer register file 1008 is split into two separate register files, one register file for the low order 32 bits of data and a second register file for the upper order 32 bits of data. The floating point register file 1010 of one implementation has 128 bit wide entries because floating point instructions typically have operands from 66 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions use to execute. The processor 1000 of one implementation is comprised of a number of execution units: address generation unit (AGU) 1012, AGU 1014, fast arithmetic logic unit (ALU) 1016, fast ALU 1018, slow ALU 1020, floating point ALU 1022, floating point move unit 1024. For one implementation, the floating point execution blocks 1022, 1024, execute floating point, multimedia extension (MMU), single instruction multiple data (SIMD), streaming SIMD extensions (SSE) and or other operations as described below. The floating point ALU 1022 of one implementation includes a 64 bit by 54 bit floating point divider to execute divide, square root, and remainder micro-ops. For implementations of the invention, instructions involving a floating point value may be handled with the floating point hardware.

In one implementation, the ALU operations go to the high-speed ALU execution units 1016, 1018. The fast ALUs 1016, 1018, of one implementation can execute fast operations with an effective latency of half a clock cycle. For one implementation, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For one implementation, the integer ALUs 1016, 1018, 1020 are described in the context of performing integer operations on 64 bit data operands. In alternative implementations, the ALUs 1016, 1018, 1020 can be implemented to support a variety of data bits including 16, 32, 128, 256, etc. Similarly, the floating point units 1022, 1024 can be implemented to support a range of operands having bits of various widths. For one implementation, the floating point units 1022, 1024 can operate on 128 bits wide packed data operands in conjunction with SIMD and multimedia instructions.

In one implementation, the uops schedulers 1001 1002, 1004, 1006 dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one implementation of a processor are also designed to catch instruction sequences for text string comparison operations.

The processor 1000 may include a retirement unit 1054 coupled to the execution block 1011. The retirement unit 1054 may include a linear memory management unit 1005 according to implementations of the invention.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32 bit integer data.

A register file of one implementation also contains eight multimedia SIMD registers for packed data. For the discussions below, the registers are understood to be data registers designed to hold packed data, such as 64 bit wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bit wide XMM registers relating to SSE2, SSE3, SSE4, or beyond (referred to generically as "SSEx") technology can also be used to hold such packed data operands. In one implementation, in storing packed data and integer data, the registers do not differentiate between the two data types. In one implementation, integer and floating point data are contained in either the same register file or different register files. Furthermore, in one implementation, floating point and integer data may be stored in different registers or the same registers.

Figure 11:
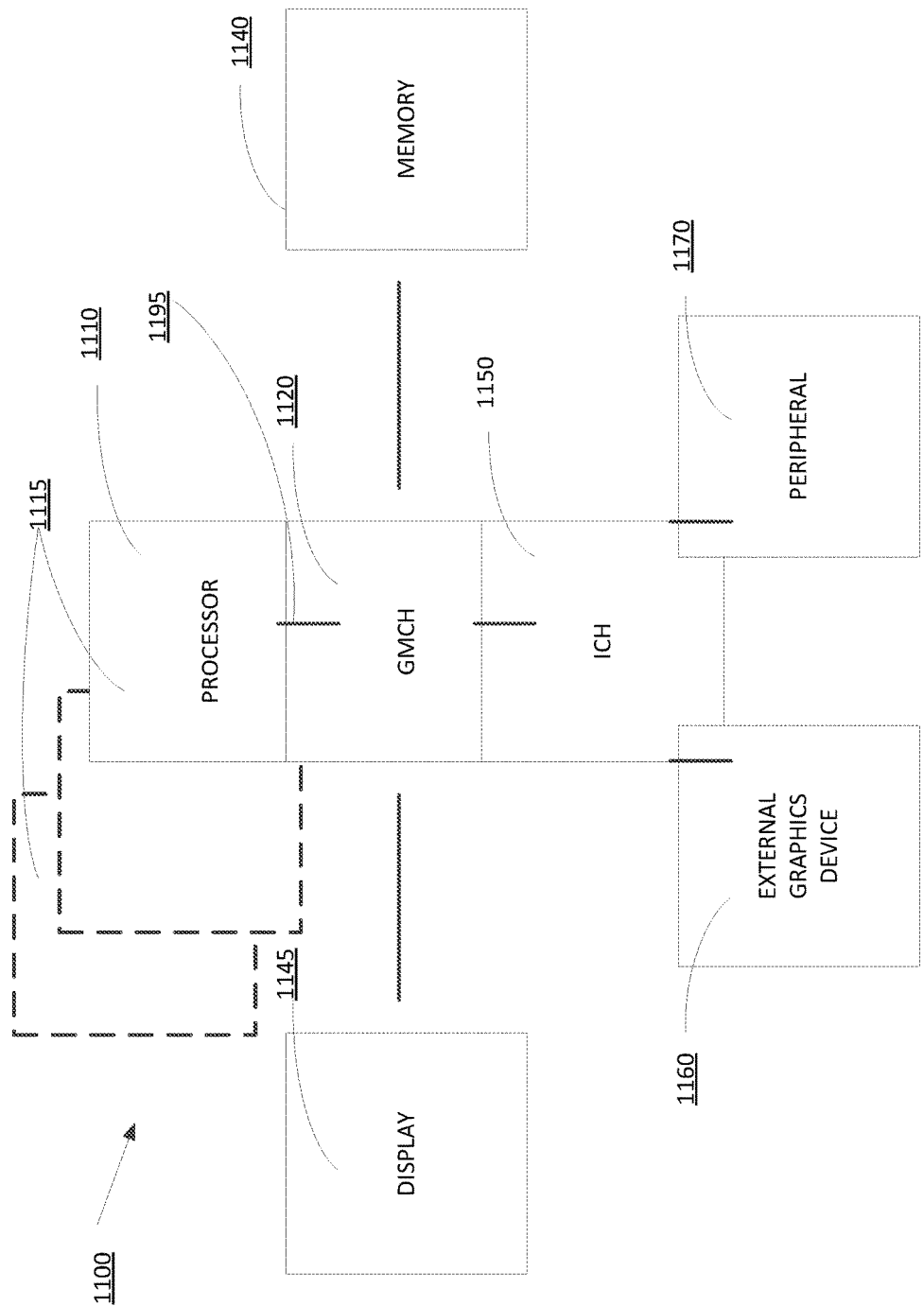
FIG. 11 illustrates a block diagram of a computer system in accordance with one implementation of the invention.

Referring now to FIG. 11, shown is a block diagram of a computer system 1100 in accordance with one implementation of the invention. The system 1100 may include one or more processors 1110, and additional processors 1115, which are coupled to graphics memory controller hub (GMCH) 1120. The optional nature of the additional processors 1115 is denoted in FIG. 11 with dashed lines. In one implementation, a processor 1110, 1115 monitors performance of a processing device to manage non-precise events.

Each processor 1110, 1115 may be some version of the circuit, integrated circuit, processor, and/or silicon integrated circuit as described above. However, it should be noted that it is unlikely that integrated graphics logic and integrated memory control units would exist in the processors 1110, 1115. FIG. 11 illustrates that the GMCH 1120 may be coupled to a memory 1140 that may be, for example, a dynamic random access memory (DRAM). The DRAM may, for at least one implementation, be associated with a non-volatile cache.

The GMCH 1120 may be a chipset, or a portion of a chipset. The GMCH 1120 may communicate with the processor(s) 1110, 1115 and control interaction between the processor(s) 1110, 1115 and memory 1140. The GMCH 1120 may also act as an accelerated bus interface between the processor(s) 1110, 1115 and other elements of the system 1100. For at least one implementation, the GMCH 1120 communicates with the processor(s) 1110, 1115 via a multi-drop bus, such as a front side bus (FSB) 1195.

Furthermore, GMCH 1120 is coupled to a display 1145 (such as a flat panel or touchscreen display). GMCH 1120 may include an integrated graphics accelerator. GMCH 1120 is further coupled to an input/output (I/O) controller hub (ICH) 1150, which may be used to couple various peripheral devices to system 1100. Shown for example in the implementation of FIG. 11 is an external graphics device 1160, which may be a discrete graphics device coupled to ICH 1150, along with another peripheral device 1170.

Alternatively, additional or different processors may also be present in the system 1100. For example, additional processor(s) 1115 may include additional processors(s) that are the same as processor 1110, additional processor(s) that are heterogeneous or asymmetric to processor 1110, accelerators (such as, e.g., graphics accelerators or digital signal processing (DSP) units), field programmable gate arrays, or any other processor. There can be a variety of differences between the processor(s) 1110, 1115 in terms of a spectrum of metrics of merit including architectural, micro-architectural thermal, power consumption characteristics, and the like. These differences may effectively manifest themselves as asymmetry and heterogeneity amongst the processors 1110, 1115. For at least one implementation, the various processors 1110, 1115 may reside in the same die package.

Figure 12:
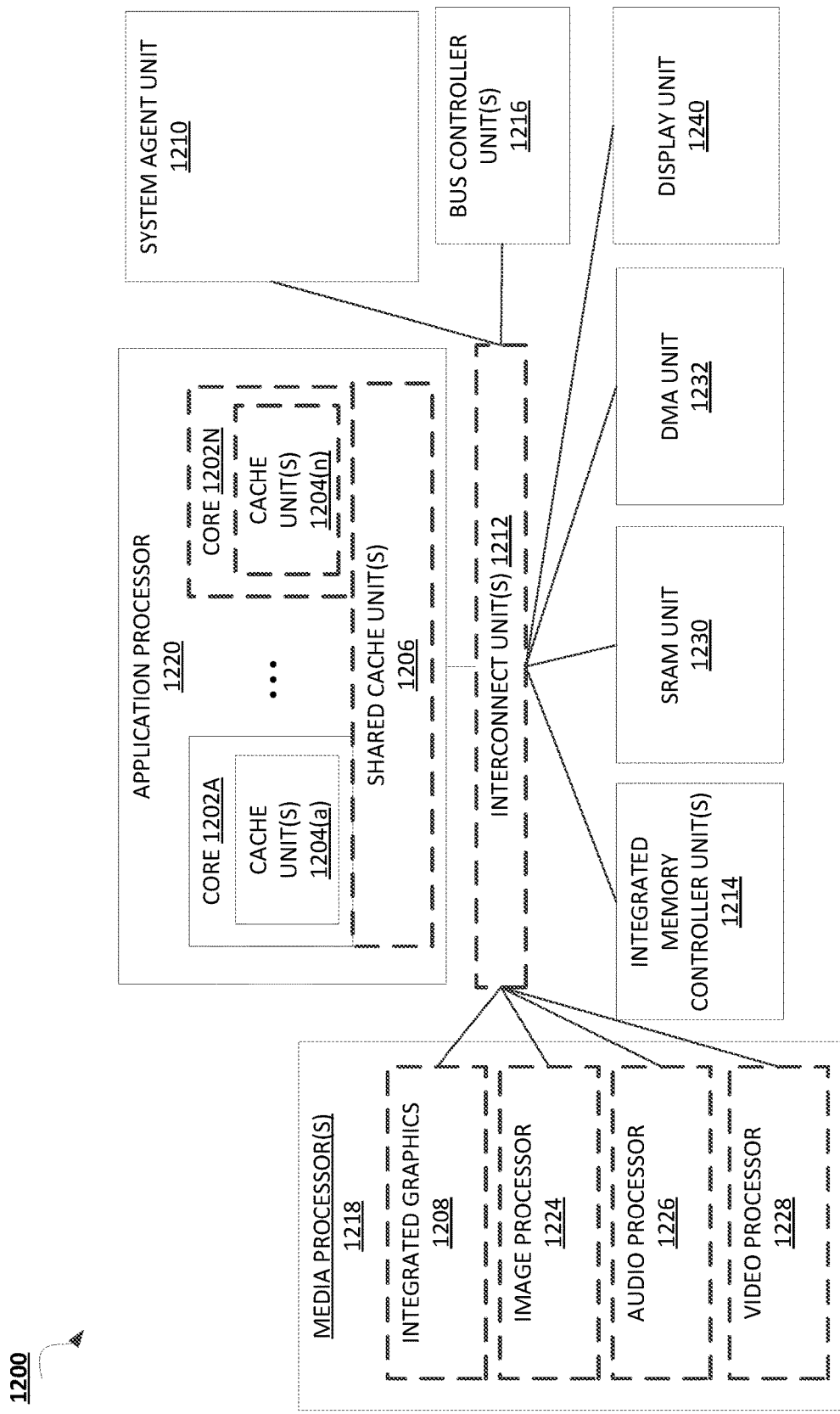
FIG. 12 is a block diagram illustrating a system in which an implementation of the disclosure may be used.

Implementations may be implemented in many different system types. FIG. 12 is a block diagram of a SoC 1200 in accordance with an implementation of the present disclosure. Dashed lined boxes are optional features on more advanced SoCs. In FIG. 12, an interconnect unit(s) 1212 is coupled to: an application processor 1220 which includes a set of one or more cores 1202A-N and shared cache unit(s) 1206; a system agent unit 1210; a bus controller unit(s) 1216; an integrated memory controller unit(s) 1214; a set of one or more media processors 1218 which may include an integrated graphics logic 1208, an image processor 1224 for providing still and/or video camera functionality, an audio processor 1226 for providing hardware audio acceleration, and a video processor 1228 for providing video encode/decode acceleration; a static random access memory (SRAM) unit 1230; a direct memory access (DMA) unit 1232; and a display unit 1240 for coupling to one or more external displays. In one implementation, a memory module may be included in the integrated memory controller unit(s) 1214. In another implementation, the memory module may be included in one or more other circuits of the SoC 1200 that may be used to access and/or control a memory. The application processor 1220 may include a conditional branch, indirect branch and event execution logics as described in implementations herein.

The memory hierarchy includes one or more levels of cache within the cores, a set of one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof.

In some implementations, one or more of the cores 1202A-N are capable of multi-threading.

The system agent 1210 includes those circuits coordinating and operating cores 1202A-N. The system agent unit 1210 may include for example a power control unit (PCU) and a display unit. The PCU may be or include logic and circuits needed for regulating the power state of the cores 1202A-N and the integrated graphics logic 1208. The display unit is for driving one or more externally connected displays.

The cores 1202A-N may be homogenous or heterogeneous in terms of architecture and/or instruction set. For example, some of the cores 1202A-N may be in order while others are out-of-order. As another example, two or more of the cores 1202A-N may be capable of executing the same instruction set, while others may be capable of executing only a subset of that instruction set or a different instruction set.

The application processor 1220 may be a general-purpose processor, such as a Core™ i3, i5, i7, 2 Duo and Quad, Xeon™, Itanium™, Atom™, XScale™ or StrongARM™ processor, which are available from Intel™ Corporation, of Santa Clara, Calif. Alternatively, the application processor 1220 may be from another company, such as ARM Holdings™, Ltd, MIPS™, etc. The application processor 1220 may be a special-purpose processor, such as, for example, a network or communication processor, compression engine, graphics processor, co-processor, embedded processor, or the like. The application processor 1220 may be implemented on one or more chips. The application processor 1220 may be a part of and/or may be implemented on one or more substrates using any of a number of process technologies, such as, for example, bipolar complementary metal oxide semiconductor (BiCMOS), complementary metal oxide semiconductor (CMOS) or negative channel metal oxide semiconductor (NMOS).

Figure 13:
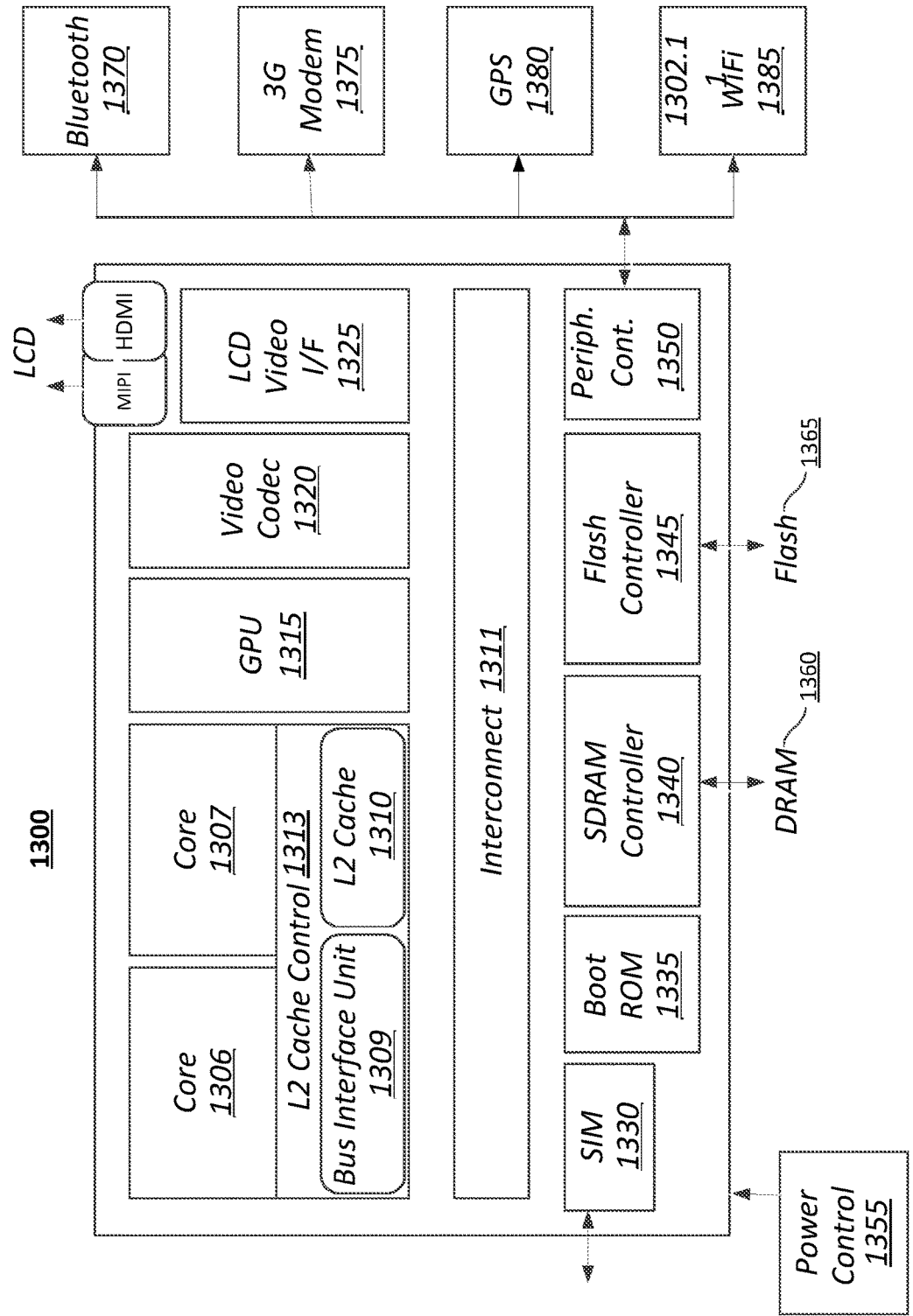
FIG. 13 is a block diagram of a system in which an implementation of the disclosure may operate.

FIG. 13 is a block diagram of an implementation of a system on-chip (SoC) design in accordance with the present disclosure. As a specific illustrative example, SoC 1300 is included in user equipment (UE). In one implementation, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a global system for mobile communication (GSM) network.

Here, SOC 1300 includes 2 cores—1306 and 1307. Cores 1306 and 1307 may conform to an Instruction Set Architecture, such as an Intel® Architecture Core™-based processor, an Advanced Micro Devices™, Inc. (AMD) processor, a MIPS-based processor, an ARM-based processor design, or a customer thereof, as well as their licensees or adopters. Cores 1306 and 1307 are coupled to cache control 13013 that is associated with bus interface unit 1309 and L2 cache 1310 to communicate with other parts of SoC 1300. Interconnect 1311 includes an on-chip interconnect, such as an Intel on-chip system fabric (IOSF), advanced microcontroller bus architecture (AMBA) or other interconnect discussed above, which potentially implements one or more aspects of the described disclosure. In one implementation, a conditional branch, indirect branch and event execution logics may be included in cores 1306, 1307.

Interconnect 1311 provides communication channels to the other circuits, such as a Subscriber Identity Module (SIM) 1330 to interface with a SIM card, a boot read only memory (ROM) 1335 to hold boot code for execution by cores 1306 and 1307 to initialize and boot SoC 1300, a synchronous dynamic random-access memory (SDRAM) controller 1340 to interface with external memory (e.g. dynamic random-access memory (DRAM) 1360), a flash controller 1345 to interface with non-volatile memory (e.g. Flash 1365), a peripheral control 1350 (e.g. Serial Peripheral Interface) to interface with peripherals, video codec 1320 and LCD Video interface 1325 to display and receive input (e.g. touch enabled input), GPU 1315 to perform graphics related computations, etc. Any of these interfaces may incorporate aspects of the disclosure described herein. In addition, the SoC 1300 illustrates peripherals for communication, such as a Bluetooth module 1370, 3G modem 1375, global positioning system (GPS) 1380, and 1302.11 Wi-Fi 1385.

Figure 14:
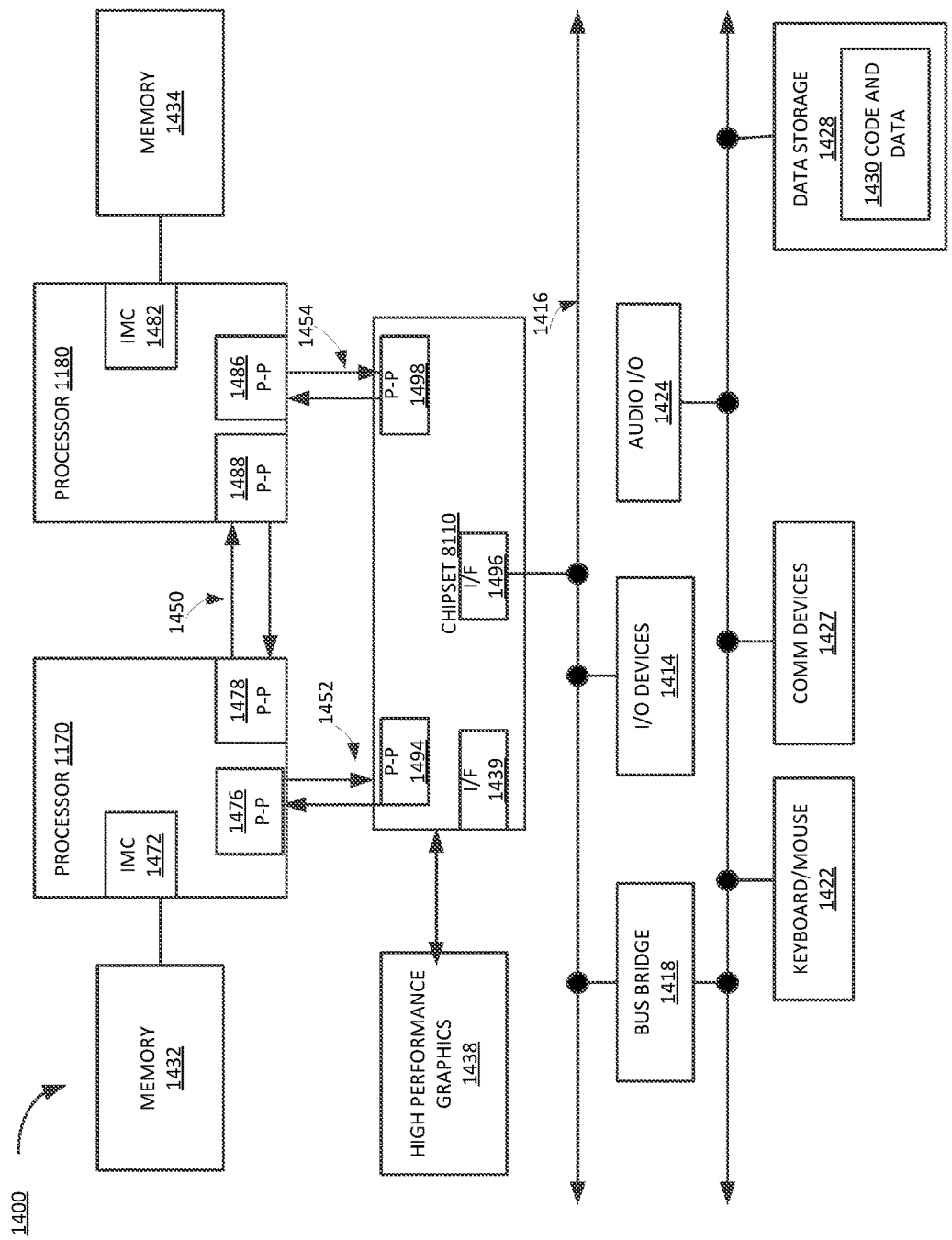
FIG. 14 is a block diagram of a system in which an implementation of the disclosure may operate.

Referring now to FIG. 14, shown is a block diagram of a computer system 1400 in accordance with an implementation of the invention. As shown in FIG. 14, the computer system 1400 is a point-to-point interconnect system, and includes a first processor 1470 and a second processor 1480 coupled via a point-to-point interconnect 1450. Each of processors 1470 and 1480 may be some version of the processors of the computing systems as described herein. While shown with two processors 1470, 1480, it is to be understood that the scope of the disclosure is not so limited. In other implementations, one or more additional processors may be present in a given processor.

Processors 1470 and 1480 are shown including integrated memory controller (IMC) units 1472 and 1482, respectively. Processor 1470 also includes as part of its bus controller units, point-to-point (P-P) interfaces 1476 and 1478; similarly, second processor 1480 includes P-P interfaces 1486 and 1488. Processors 1470, 1480 may exchange information via the point-to-point (P-P) interconnect 1450 using P-P interfaces 1478, 1488. As shown in FIG. 14, IMC units 1472 and 1482 couple the processors to respective memories, namely a memory 1432 and a memory 1434, which may be portions of main memory locally attached to the respective processors.

Processors 1470 and 1480 may each exchange information with a chipset 1490 via individual P-P interfaces 1452, 1454 using point to point interfaces 1476, 1494, 1486, 1498. Chipset 1490 may also exchange information with a high-performance graphics circuit 1438 via a high-performance graphics interface 1439.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one implementation, first bus 1416 may be a Peripheral Circuit Interconnect (PCI) bus, or a bus such as a PCI Express bus or another third generation I/O interconnect bus, although the scope of the disclosure is not so limited.

As shown in FIG. 14, various I/O devices 1414 may be coupled to first bus 1416, along with a bus bridge 1418, which couples first bus 1416 to a second bus 1420. In one implementation, second bus 1420 may be a low pin count (LPC) bus. Various devices may be coupled to second bus 1420 including, for example, a keyboard and/or mouse 1422, communication devices 1427 and a data storage unit 1428 such as a disk drive or other mass storage device which may include instructions/code and data 1430, in one implementation. Further, an audio I/O interface 1424 may be coupled to second bus 1420. Note that other architectures are possible. For example, instead of the point-to-point architecture of FIG. 11, a system may implement a multi-drop bus or other such architecture.

Figure 15:
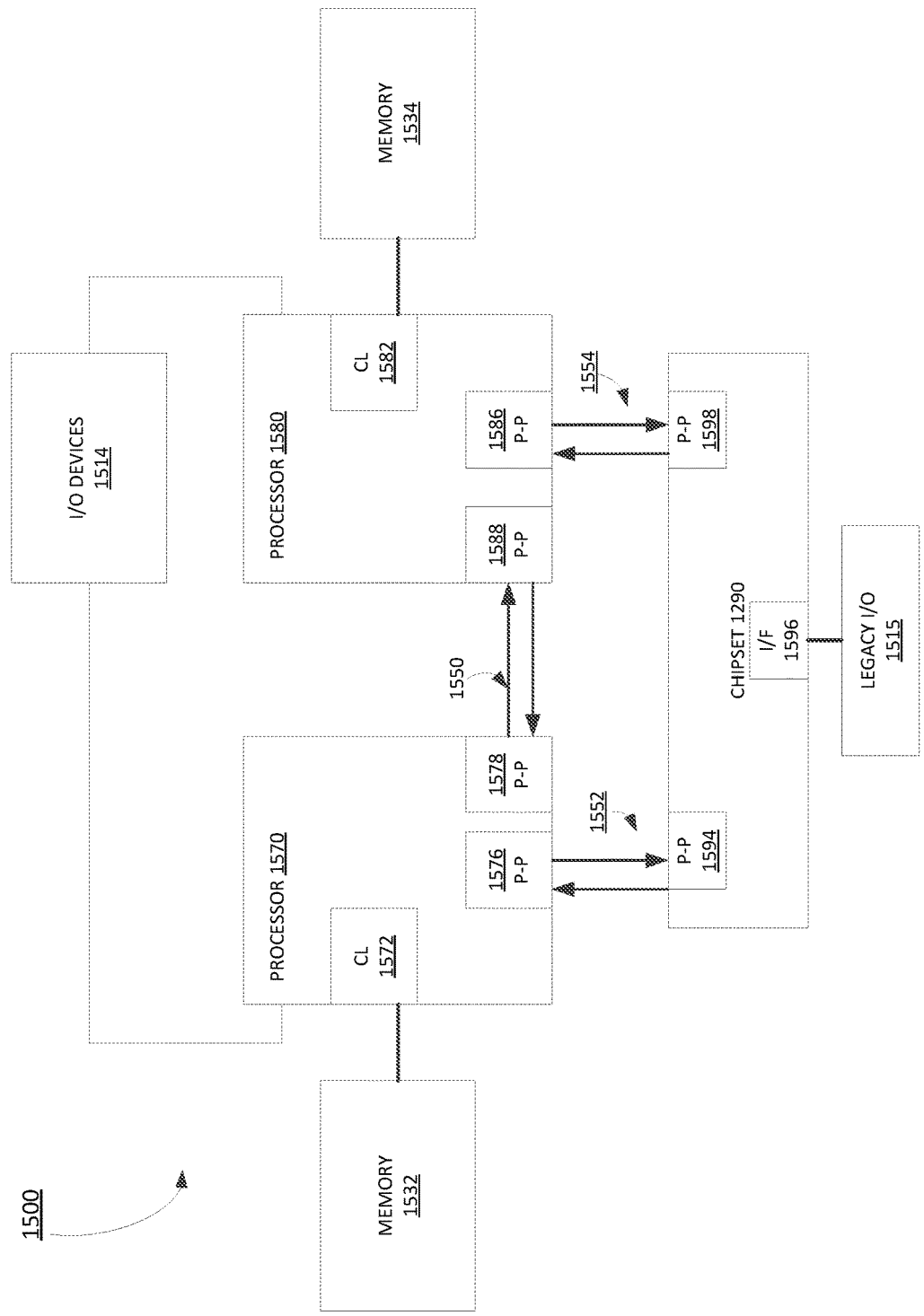
FIG. 15 is a block diagram of a System-on-a-Chip (SoC) in accordance with an implementation of the present disclosure

Referring now to FIG. 15, shown is a block diagram of a system 1500 in accordance with an implementation of the invention. FIG. 15 illustrates processors 1570, 1580. In one implementation, processors 1570, 1580 monitor performance of a processing device to manage non-precise events. Furthermore, processors 1570, 1580 may include integrated memory and I/O control logic ("CL") 1572 and 1582, respectively and intercommunicate with each other via point-to-point interconnect 1550 between point-to-point (P-P) interfaces 1578 and 1588 respectively. Processors 1570, 1280 each communicate with chipset 1590 via point-to-point interconnect 1552 and 1554 through the respective P-P interfaces 1576 to, 1594 and 1586 to, 1598 as shown. For at least one implementation, the CLs 1572, 1582 may include integrated memory controller units. CLs 1572, 1582 may include I/O control logic. As depicted, memories 1532, 1534 are coupled to CLs 1572, 1582, and I/O devices 1514 are also coupled to the CLs 1572, 1582. Legacy I/O devices 1515 are coupled to the chipset 1590 via interface 1596.

Figure 16:
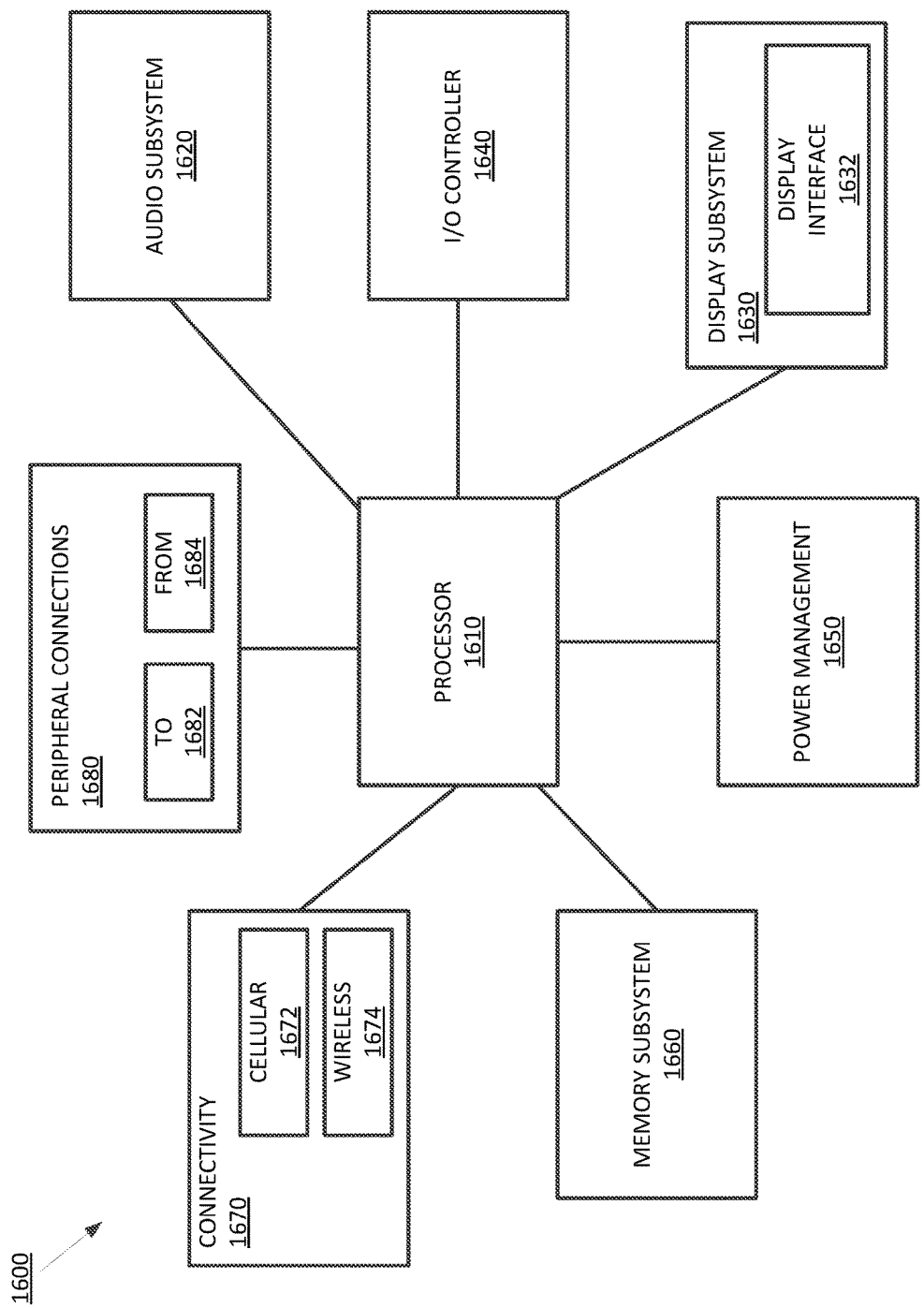
FIG. 16 is a block diagram of an implementation of a SoC design in accordance with the present disclosure.

FIG. 16 illustrates a block diagram 1600 of an implementation of a tablet computing device, a smartphone, or other mobile device in which touchscreen interface connectors may be used. Processor 1610 may monitor performance of a processing device to manage non-precise events. In addition, processor 1610 performs the primary processing operations. Audio subsystem 1620 represents hardware (e.g., audio hardware and audio circuits) and software (e.g., drivers, codecs) circuits associated with providing audio functions to the computing device. In one implementation, a user interacts with the tablet computing device or smartphone by providing audio commands that are received and processed by processor 1610.

Display subsystem 1630 represents hardware (e.g., display devices) and software (e.g., drivers) circuits that provide a visual and/or tactile display for a user to interact with the tablet computing device or smartphone. Display subsystem 1630 includes display interface 1632, which includes the particular screen or hardware device used to provide a display to a user. In one implementation, display subsystem 1630 includes a touchscreen device that provides both output and input to a user.

I/O controller 1640 represents hardware devices and software circuits related to interaction with a user. I/O controller 1640 can operate to manage hardware that is part of audio subsystem 1620 and/or display subsystem 1630. Additionally, I/O controller 1640 illustrates a connection point for additional devices that connect to the tablet computing device or smartphone through which a user might interact. In one implementation, I/O controller 1640 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one implementation, the tablet computing device or smartphone includes power management 1650 that manages battery power usage, charging of the battery, and features related to power saving operation. Memory subsystem 1660 includes memory devices for storing information in the tablet computing device or smartphone. Connectivity 1670 includes hardware devices (e.g., wireless and/or wired connectors and communication hardware) and software circuits (e.g., drivers, protocol stacks) to the tablet computing device or smartphone to communicate with external devices. Cellular connectivity 1672 may include, for example, wireless carriers such as GSM (global system for mobile communications), CDMA (code division multiple access), TDM (time division multiplexing), or other cellular service standards). Wireless connectivity 1674 may include, for example, activity that is not cellular, such as personal area networks (e.g., Bluetooth), local area networks (e.g., WiFi™), and/or wide area networks (e.g., WiMax™), or other wireless communication.

Peripheral connections 1680 include hardware interfaces and connectors, as well as software circuits (e.g., drivers, protocol stacks) to make peripheral connections as a peripheral device ("to" 1682) to other computing devices, as well as have peripheral devices ("from" 1684) connected to the tablet computing device or smartphone, including, for example, a "docking" connector to connect with other computing devices. Peripheral connections 1680 include common or standards-based connectors, such as a Universal Serial Bus (USB) connector, DisplayPort including MiniDisplayPort (MDP), High Definition Multimedia Interface (HDMI), Firewire, etc.

Figure 17:
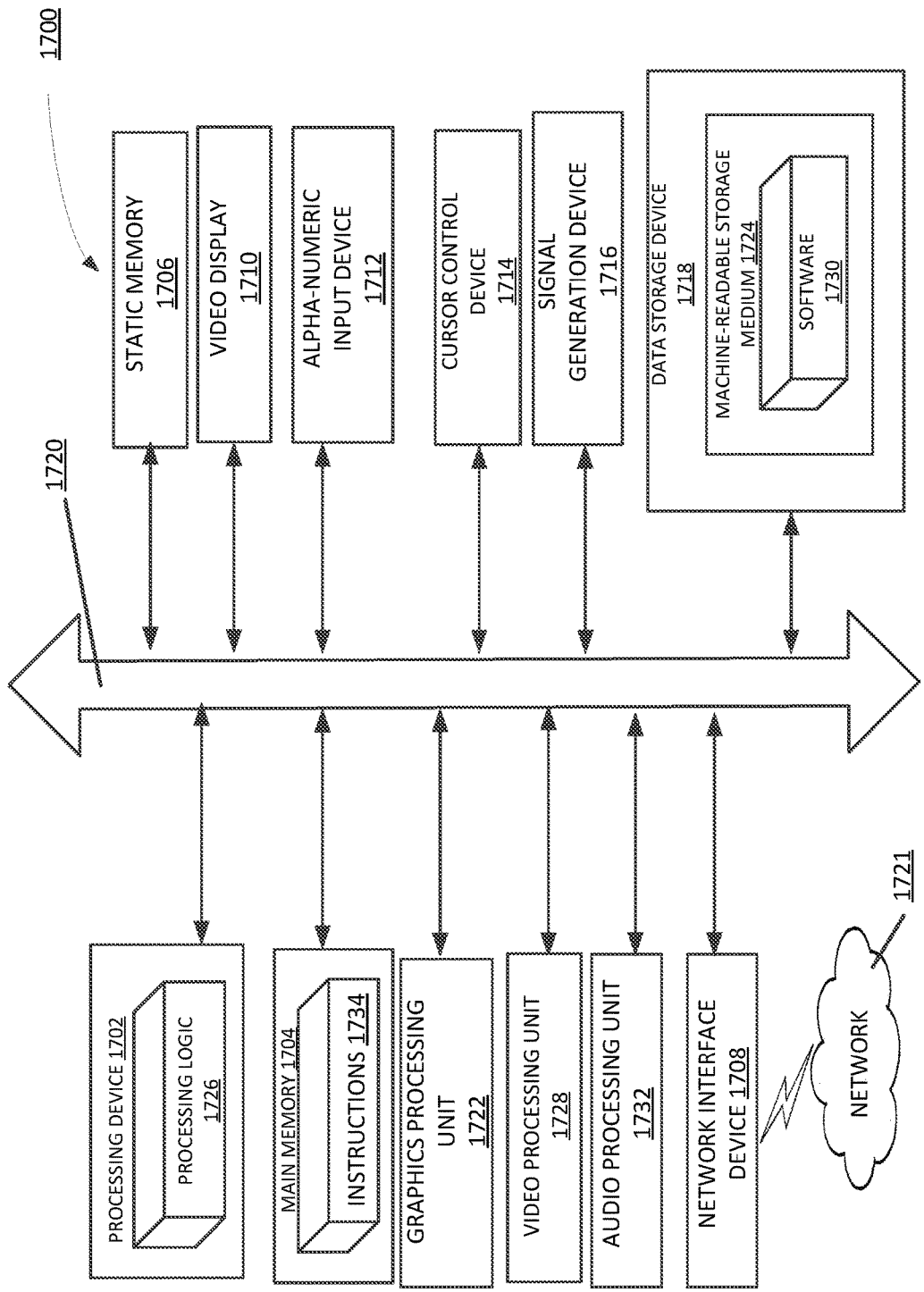
FIG. 17 illustrates a block diagram of one implementation of a computer system.

FIG. 17 illustrates a diagrammatic representation of a machine in the example form of a computing system 1700 within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methods discussed herein.

The computing system 1700 includes a processing device 1702, a main memory 1704 (e.g., read-only memory (ROM), flash memory, dynamic random access memory (DRAM) (such as synchronous DRAM (SDRAM) or rambus DRAM (RDRAM), etc.), a static memory 1706 (e.g., flash memory, static random access memory (SRAM), etc.), and a data storage device 1718, which communicate with each other via a bus 1720.

Processing device 1702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1702 may also be one or more special-purpose processing devices such as an application-specific integrated circuit (ASIC), a field programmable gate array (FPGA), a digital signal processor (DSP), network processor, or the like. In one implementation, processing device 1702 may include one or more processing cores. The processing device 1702 is configured to execute the processing logic 1702 for performing the operations discussed herein. In one implementation, processing device 1702 is the same as computer system 100 as described with respect to FIG. 1 that implements the linear memory management unit 112. Alternatively, the computing system 1700 can include other circuits as described herein.

The computing system 1700 may further include a network interface device 1708 communicably coupled to a network 1721. The computing system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), a signal generation device 1716 (e.g., a speaker), or other peripheral devices. Furthermore, computing system 1700 may include a graphics processing unit 1722, a video processing unit 1728 and an audio processing unit 1732. In another implementation, the computing system 1700 may include a chipset (not illustrated), which refers to a group of integrated circuits, or chips, that are designed to work with the processing device 1702 and controls communications between the processing device 1702 and external devices. For example, the chipset may be a set of chips on a motherboard that links the processing device 1702 to very high-speed devices, such as main memory 1704 and graphic controllers, as well as linking the processing device 1702 to lower-speed peripheral buses of peripherals, such as universal serial bus (USB), peripheral circuit interconnect (PCI) or industry standard architecture (ISA) buses.

The data storage device 1718 may include a computer or machine-readable storage medium 1724 on which is stored software 1730 embodying any one or more of the methods of functions described herein. The software 1730 may also reside, completely or at least partially, within the main memory 1704 as instructions—1734 and/or within the processing device 1702 as processing logic 1726 during execution thereof by the computing system 1700; the main memory 1704 and the processing device 1702 also constituting computer-readable storage medium.

The computer-readable storage medium 1724 may also be used to store instructions 1734 utilizing the linear memory management unit 112 described with respect to FIG. 1 and/or a software library containing methods that call the above applications. While the computer-readable storage medium 1724 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods of the implementations. The term "computer-readable storage medium" shall accordingly be taken to include, but not be limited to, solid-state memories, and optical and magnetic media. While the invention has been described with respect to a limited number of implementations, those skilled in the art will appreciate numerous modifications and variations therefrom. It is intended that the appended claims cover all such modifications and variations as fall within the true spirit and scope of this invention.

The following examples pertain to further implementations.

Example 1 is a processing device comprising a linear address transformation circuit to determine that a metadata value stored in a portion of a linear address falls within a pre-defined metadata range, wherein the metadata value corresponds to a plurality of metadata bits; and replace each of the plurality of metadata bits with a constant value.

In Example 2, the subject matter of Example 1 can optionally include wherein each of the plurality of metadata bits are used for description of data stored at the linear address, wherein each of the plurality of metadata bits are not part of memory addressing.

In Example 3, the subject matter of Examples 1-2 can optionally include wherein the constant value comprises 0.

In Example 4, the subject matter of Examples 1-3 can optionally include wherein the linear address transformation circuit to replace each of the plurality of metadata bits with the constant value prior to paging a physical address by a translation lookaside buffer (TLB), wherein the physical address comprises a translation of the linear address.

In Example 5, the subject matter of Examples 1-4 can optionally include wherein the linear address transformation circuit to replace each of the plurality of metadata bits with the constant value in response to a miss by a translation lookaside buffer (TLB) paging a portion of a physical address corresponding to the portion of the linear address, wherein the physical address comprises a translation of the linear address.

In Example 6, the subject matter of Examples 1-5 can optionally include a linear address paging circuit communicably coupled to the linear address transformation circuit, the linear address paging circuit to identify a translation lookaside buffer (TLB) entry among a plurality of TLB entries of a TLB, wherein the identified TLB entry to page a portion of a physical address corresponding to the portion of the linear address, and wherein the physical address is a translation of the linear address; and set a metadata status flag in the identified TLB entry.

In Example 7, the subject matter of Examples 1-6 can optionally include wherein the linear address paging circuit is further to flush the identified TLB entry.

In Example 8, the subject matter of Examples 1-7 can optionally include a linear address paging circuit communicably coupled to the linear address transformation circuit, the linear address paging circuit to identify a translation lookaside buffer (TLB) entry among a plurality of TLB entries of a TLB, wherein the identified TLB entry to page a portion of a physical address corresponding to the portion of the linear address, and wherein the physical address is a translation of the linear address; and ignore each of the plurality of metadata bits.

In Example 9, the subject matter of Examples 1-8 can optionally include wherein each of the plurality of metadata bits are ignored after the linear address is generated.

In Example 10, the subject matter of Examples 1-9 can optionally wherein each of the plurality of metadata bits are ignored at a time that the linear address is generated.

Example 11 is a system comprising a memory; and a processing device, communicably coupled to the memory, comprising a linear address transformation circuit to determine that a metadata value stored in a portion of a linear address falls within a pre-defined metadata range, wherein the metadata value corresponds to a plurality of metadata bits; and a linear address paging circuit communicably coupled to the linear address transformation circuit, the linear address paging circuit to identify a translation lookaside buffer (TLB) entry among a plurality of TLB entries, wherein the identified TLB entry to page a portion of a physical address corresponding to the portion of the linear address, and ignore each of the plurality of metadata bits in the portion of the physical address in the identified TLB entry, wherein the physical address is a translation of the linear address.

In Example 12, the subject matter of Example 11 can optionally include wherein each of the plurality of the metadata bits are ignored after the linear address is generated.

In Example 13, the subject matter of Examples 11-12 can optionally include wherein each of the plurality of the metadata bits are ignored at a time that the linear address is generated.

Example 14 is a hardware-implemented method comprising determining that a metadata value stored in a portion of a linear address falls within a pre-defined metadata range, wherein the metadata value corresponds to a plurality of metadata bits; and replacing each of the plurality of metadata bits with a constant value.

In Example 15, the subject matter of Example 14 can optionally include wherein each of the plurality of metadata bits are used for description of data stored at the linear address, wherein each of the plurality of metadata bits are not part of memory addressing.

In Example 16, the subject matter of Examples 14-15 can optionally include wherein the constant value comprises 0.

In Example 17, the subject matter of Examples 14-16 can optionally include wherein the replacing comprising replacing each of the plurality of metadata bits with the constant value prior to paging a physical address by a translation lookaside buffer (TLB), wherein the physical address comprises a translation of the linear address.

In Example 18, the subject matter of Examples 14-17 can optionally include wherein the replacing comprising replacing each of the plurality of metadata bits with the constant value in response to a miss by a translation lookaside buffer (TLB) paging a portion of a physical address corresponding to the portion of the linear address, wherein the physical address comprises a translation of the linear address.

In Example 19, the subject matter of Examples 14-18 can optionally include identifying a translation lookaside buffer (TLB) entry among a plurality of TLB entries of a TLB, wherein the identified TLB pages a portion of a physical address corresponding to the portion of the linear address, and wherein the physical address is a translation of the linear address; and setting a metadata status flag in the identified TLB entry.

In Example 20, the subject matter of Examples 14-19 can optionally include flushing the identified TLB entry.

Example 21 is a non-transitory machine-readable storage medium including instructions that, when accessed by a processing device, cause the processing device to perform operations comprising determining that a metadata value stored in a portion of a linear address falls within a pre-defined metadata range, wherein the metadata value corresponds to a plurality of metadata bits; identifying a translation lookaside buffer (TLB) entry among a plurality of TLB entries of a TLB, wherein the identified TLB to page a portion of a physical address corresponding to the portion of the linear address; and ignoring each of the plurality of metadata bits.

In Example 22, the subject matter of Example 21 can optionally include wherein the operations further comprising replacing each of the plurality of metadata bits with a constant value in response to a miss by the identified TLB entry.

In Example 23, the subject matter of Examples 21-22 can optionally include wherein each of the plurality of metadata bits are ignored after the linear address is generated.

In Example 24, the subject matter of Examples 21-23 can optionally include wherein each of the plurality of the metadata bits are ignored at a time when the linear address is generated.

In Example 25, the subject matter of Examples 21-24 can optionally include wherein the operations further comprising setting a metadata status flag in the identified TLB entry.

Various implementations may have different combinations of the structural features described above. For instance, all optional features of the SOC described above may also be implemented with respect to a processor described herein and specifics in the examples may be used anywhere in one or more implementations.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform the designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' and/or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which transitory signals or media are to be distinguished from the non-transitory mediums or media that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the present disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplary language does not necessarily refer to the same implementation or the same example, but may refer to different and distinct implementations, as well as potentially the same implementation.

What is claimed is:

1. A processing device comprising:
   a linear address transformation hardware circuit to:
   determine that a metadata value stored in a portion of a linear address falls within a pre-defined metadata range, wherein the metadata value corresponds to a plurality of metadata bits; and
   replace each of the plurality of metadata bits with a constant value in response to a miss by a translation lookaside buffer (TLB) paging a portion of a physical address corresponding to the portion of the linear address, wherein the physical address comprises a translation of the linear address.

2. The processing device of claim 1 wherein each of the plurality of metadata bits are used for description of data stored at the linear address, wherein each of the plurality of metadata bits are not part of memory addressing.

3. The processing device of claim 1 wherein the constant value comprises 0.

4. The processing device of claim 1 wherein the linear address transformation circuit to replace each of the plurality of metadata bits with the constant value prior to paging a physical address by the TLB, wherein the physical address comprises a translation of the linear address.

5. The processing device of claim 1 further comprising:
   a linear address paging circuit communicably coupled to the linear address transformation circuit, the linear address paging circuit to:
   identify a TLB entry among a plurality of TLB entries of the TLB, wherein the identified TLB entry to page a portion of a physical address corresponding to the portion of the linear address, and wherein the physical address is a translation of the linear address; and
   set a metadata status flag in the identified TLB entry.

6. The processing device of claim 5 wherein the linear address paging circuit is further to flush the identified TLB entry.

7. The processing device of claim 1 further comprising:
   a linear address paging circuit communicably coupled to the linear address transformation circuit, the linear address paging circuit to:
   identify a TLB entry among a plurality of TLB entries of the TLB, wherein the identified TLB entry to page a portion of a physical address corresponding to the portion of the linear address, and wherein the physical address is a translation of the linear address; and
   ignore each of the plurality of metadata bits.

8. The processing device of claim 7 wherein each of the plurality of metadata bits are ignored after the linear address is generated.

9. The processing device of claim 7 wherein each of the plurality of metadata bits are ignored at a time that the linear address is generated.

10. A system comprising:
    a memory; and
    a processing device, communicably coupled to the memory, comprising:
    a linear address transformation circuit to determine that a metadata value stored in a portion of a linear address falls within a pre-defined metadata range, wherein the metadata value corresponds to a plurality of metadata bits; and
    a linear address paging circuit communicably coupled to the linear address transformation circuit, the linear address paging circuit to:
    identify a translation lookaside buffer (TLB) entry among a plurality of TLB entries, wherein the identified TLB entry to page a portion of a physical address corresponding to the portion of the linear address,
    ignore each of the plurality of metadata bits in the portion of the physical address in the identified TLB entry, wherein the physical address is a translation of the linear address; and
    replace each of the plurality of metadata bits with a constant value in response to a miss by the identified TLB entry.

11. The system of claim 10 wherein each of the plurality of the metadata bits are ignored after the linear address is generated.

12. The system of claim 10 wherein each of the plurality of the metadata bits are ignored at a time that the linear address is generated.

13. A hardware implemented method comprising:
    determining that a metadata value stored in a portion of a linear address falls within a pre-defined metadata range, wherein the metadata value corresponds to a plurality of metadata bits; and
    replacing each of the plurality of metadata bits with a constant value in response to a miss by a translation lookaside buffer (TLB) paging a portion of a physical address corresponding to the portion of the linear address, wherein the physical address comprises a translation of the linear address.

14. The hardware implemented method of claim 13 wherein each of the plurality of metadata bits are used for description of data stored at the linear address, wherein each of the plurality of metadata bits are not part of memory addressing.

15. The hardware implemented method of claim 13 wherein the constant value comprises 0.

16. The hardware implemented method of claim 13 wherein the replacing comprising replacing each of the plurality of metadata bits with the constant value in response to a miss by the TLB paging a portion of a physical address corresponding to the portion of the linear address, wherein the physical address comprises a translation of the linear address.

17. The hardware implemented method of claim 13 further comprising:
    identifying a TLB entry among a plurality of TLB entries of the TLB, wherein the identified TLB pages a portion of a physical address corresponding to the portion of the linear address, and wherein the physical address is a translation of the linear address; and
    setting a metadata status flag in the identified TLB entry.

18. The hardware implemented method of claim 17 further comprising:
    flushing the identified TLB entry.

19. A non-transitory machine-readable storage medium including instructions that, when accessed by a processing device, cause the processing device to perform operations comprising:
    determining that a metadata value stored in a portion of a linear address falls within a pre-defined metadata range, wherein the metadata value corresponds to a plurality of metadata bits;
    identifying a translation lookaside buffer (TLB) entry among a plurality of TLB entries of a TLB, wherein the identified TLB to page a portion of a physical address corresponding to the portion of the linear address;
    ignoring each of the plurality of metadata bits; and
    replacing each of the plurality of metadata bits with a constant value in response to a miss by the identified TLB entry.

20. The non-transitory machine-readable storage medium of claim 19 wherein each of the plurality of metadata bits are ignored after the linear address is generated.

21. The non-transitory machine-readable storage medium of claim 19 wherein each of the plurality of the metadata bits are ignored at a time when the linear address is generated.

22. The non-transitory machine-readable storage medium of claim 19 wherein the operations further comprising setting a metadata status flag in the identified TLB entry.

* * * * *